United States Patent
Inui

(10) Patent No.: US 8,125,659 B2
(45) Date of Patent: Feb. 28, 2012

(54) IMAGE PROCESSING APPARATUS DISCLOSURE INFORMATION TRANSMISSION METHOD AND DISCLOSURE INFORMATION DISPLAY METHOD

(75) Inventor: Masanobu Inui, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 931 days.

(21) Appl. No.: 12/037,317

(22) Filed: Feb. 26, 2008

(65) Prior Publication Data

US 2008/0204785 A1    Aug. 28, 2008

(30) Foreign Application Priority Data

Feb. 26, 2007   (JP) ................. 2007-045585

(51) Int. Cl.
*G06F 3/12* (2006.01)
*G06K 15/00* (2006.01)
*H04N 1/00* (2006.01)

(52) U.S. Cl. ............. 358/1.13; 358/1.14; 358/1.15; 358/402; 358/403

(58) Field of Classification Search .............. None
See application file for complete search history.

(56) References Cited

U.S. PATENT DOCUMENTS

| | | | |
|---|---|---|---|
| 2003/0076541 A1* | 4/2003 | Soneoka ............ | 358/444 |
| 2005/0195434 A1* | 9/2005 | Ohara et al. ........ | 358/1.16 |
| 2006/0044601 A1* | 3/2006 | Misawa et al. ...... | 358/1.15 |
| 2007/0127084 A1 | 6/2007 | Hayashi | |

FOREIGN PATENT DOCUMENTS

| | | |
|---|---|---|
| JP | 7-078101 A | 3/1995 |
| JP | 2005-349451 A | 6/2007 |

OTHER PUBLICATIONS

Tabuchi Atsushi; "Electronic File Management Device"; JP Pub Date Mar. 1995; Machine Translation in English of JP Pub 07-078101.*

* cited by examiner

*Primary Examiner* — Benny Tieu
*Assistant Examiner* — Haris Sabah
(74) *Attorney, Agent, or Firm* — Canon USA, Inc. I.P. Division

(57) ABSTRACT

An image processing apparatus includes a disclosure information setting unit configured to set disclosure information including information on a disclosure target related to an area of a storage unit and information on a disclosure time, a disclosure information transmission determination unit configured to determine, based on the disclosure time information, whether the disclosure information is transmitted to the disclosure target, and a disclosure information transmission unit configured to transmit the disclosure information to the disclosure target based on the disclosure target information when the disclosure information transmission determination unit determines that the disclosure information is transmitted to the disclosure target.

9 Claims, 33 Drawing Sheets

FIG. 7

| ATTRIBUTE ID | TYPE ID | VALUE | MEANING |
|---|---|---|---|
| 10 | 1 | ARBITRARY CHARACTER STRING | JOB NAME |
| 11 | 1 | ARBITRARY CHARACTER STRING | APPLICATION NAME |
| 100 | 2 | 1, 2, 3, 4, 5 | CASSETTE STAGE |
| 101 | 2 | 1, 2, 3, 4 | SHEET DISCHARGE STAGE |
| 104 | 2 | 3 | NUMBER OF COPIES |
| ... | ... | ... | ... |
| 401 | 11 | 0 TO 7015, 0 TO 9920 | IMAGE SIZE |
| 402 | 11 | 0 TO 7015, 0 TO 9920 | SHIFT AMOUNT |
| 403 | 2 | 1, 2, 3 | DUPLEX |
| 404 | 2 | 1, 2, 3, 4 | BINDING POSITION |

FIG. 8C

USER BOX SETTING/REGISTRATION

| BOX NUMBER | NAME | USE AMOUNT |
|---|---|---|
| 00 | | 0% |
| 01 | ~1103 | 0% |
| 02 | | 0% |
| 03 | | 0% |
| 04 | | 0% |
| 05 | | 0% |
| 06 | | 0% |

1/15

MEMORY REMAINING AMOUNT
100%

CLOSE

SYSTEM STATUS/STOP ▶

FIG. 8D

USER BOX SETTING/REGISTRATION

USER BOX OF 00

BOX NAME REGISTRATION ▶

PIN SETTING ▶  PLEASE LEAVE COLUMN EMPTY WHEN NOT SPECIFIED

· TIME TO AUTOMATICALLY DELETE DOCUMENT   3 DAYS ▼ ▲   INITIALIZATION
(0 NONE, 1, 2, 3, 6, 12 HOURS, 1, 2, 3, 7, 30 DAYS)

DISCLOSURE SETTING ▶   9/25/2006 10:00 TO 9/25/2006 12:00
~1104

CANCEL    OK

SYSTEM STATUS/STOP ▶

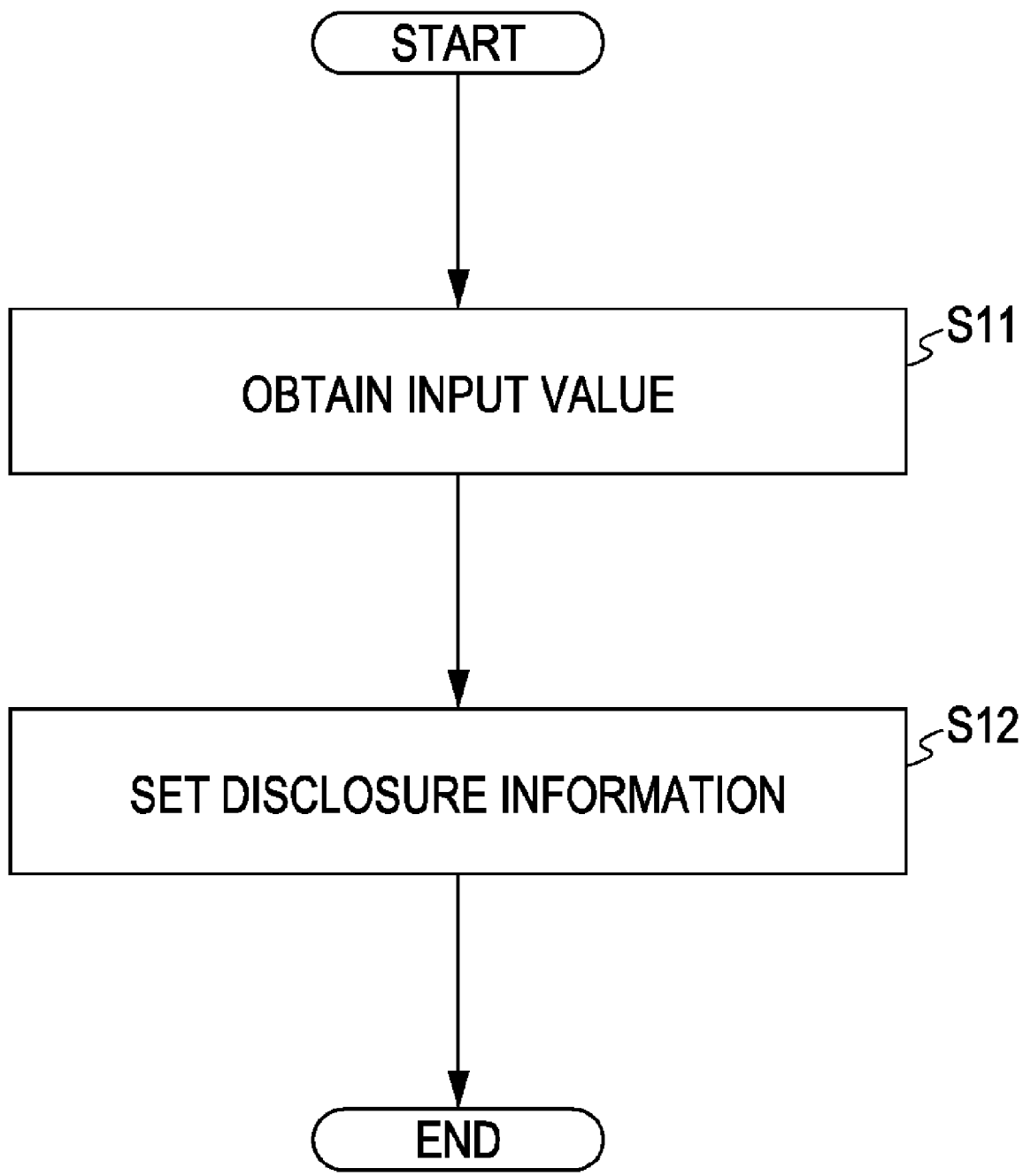

FIG. 10

| BOX NUMBER | START DATE | END DATE | START TIME | END TIME | DISCLOSURE TARGET | DISCLOSURE COMPLETED | PROCESSING |
|---|---|---|---|---|---|---|---|
| 0 | 11/21/2006 | 12/1/2006 | 10:00 | 12:00 | room1.co.jp | YES | PROCESSED |
| 3 | 12/4/2006 | 12/10/2006 | 15:00 | 17:00 | room1.co.jp | NO | UNPROCESSED |
| 10 | 12/1/2006 | 12/1/2006 | 10:00 | 12:00 | room3.co.jp | NO | UNPROCESSED |
| ...... | ...... | ...... | ...... | ...... | ...... | ...... | ...... |

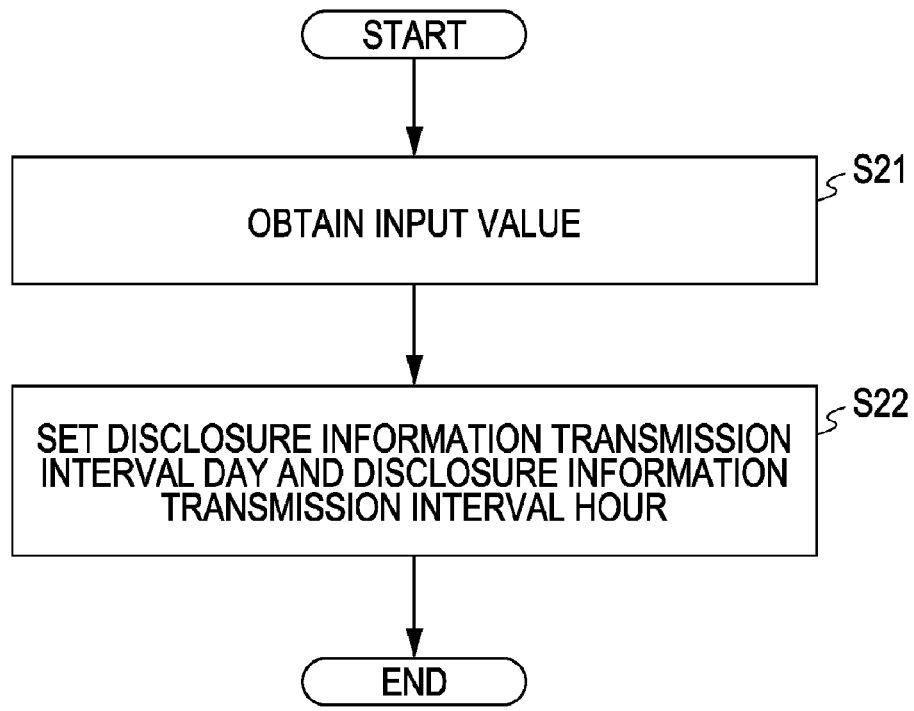

FIG. 16

| REMOTE NUMBER | START DATE | END DATE | START TIME | END TIME | DISCLOSURE SOURCE | DISPLAY | PROCESSING |
|---|---|---|---|---|---|---|---|
| 0 | 11/21/2006 | 12/1/2006 | 10:00 | 12:00 | office1.co.jp | YES | PROCESSED |
| 1 | 12/4/2006 | 12/10/2006 | 16:00 | 18:00 | office2.co.jp | NO | UNPROCESSED |
| 2 | 12/11/2006 | 12/11/2006 | 11:00 | 12:00 | office3.co.jp | NO | UNPROCESSED |
| ...... | ...... | ...... | ...... | ...... | ...... | ...... | ...... |

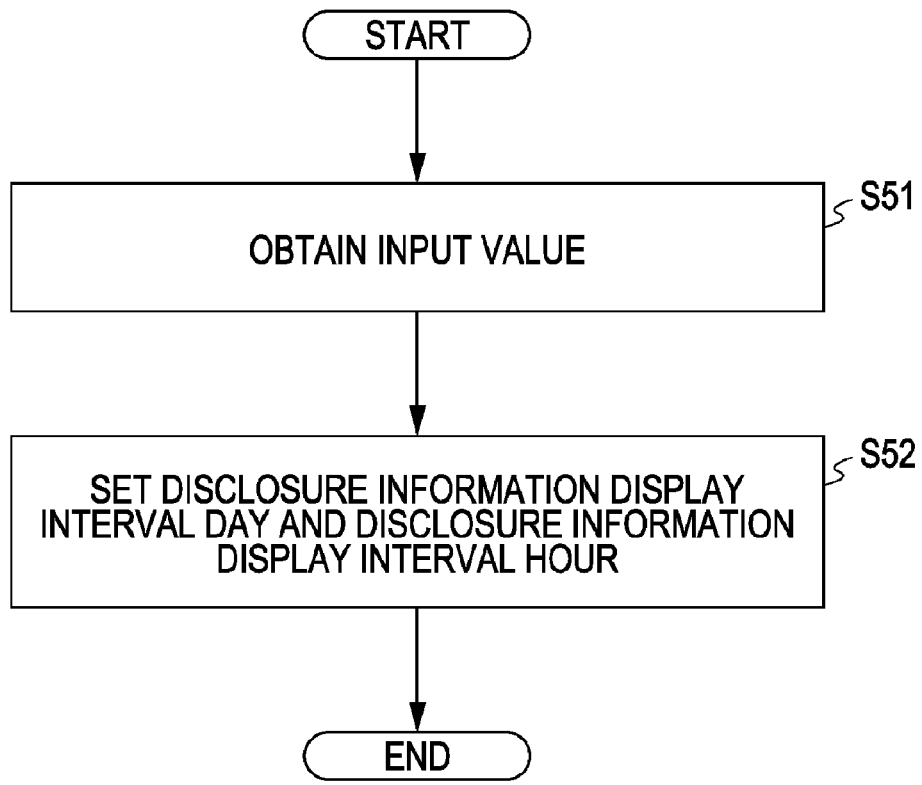

FIG. 23C

| | TYPE | DOCUMENT NAME | SHEET SIZE | PAGE | DATE/TIME | |
|---|---|---|---|---|---|---|
| 1 | | with | A4 | 1 | 11/20 14:18 | |
| | | toauto | A4 | 1 | 11/20 14:18 | 1/1 |
| | | wi thspec | A4 | 1 | 11/20 14:19 | |
| | | tospec | A4 | 1 | 11/20 14:20 | |

1405

DETAILED INFORMATION ▶    LIST PRINT ▶

PRINT ▶ — 1406

CLOSE ↵

SYSTEM STATUS/STOP ▶

FIG. 30

| ATTRIBUTE ID | TYPE ID | VALUE | MEANS |
|---|---|---|---|
| 500 | 2 | 11/21/2006 | START DATE |
| 501 | 2 | 12/1/2006 | END DATE |
| 502 | 2 | 10:00 | START TIME |
| 503 | 2 | 12:00 | END TIME |
| 504 | 1 | room1.co.jp | DISCLOSURE TARGET |
| 505 | 2 | 1 | PRIORITY FLAG |
| 506 | 2 | 1 | PROCESSING FLAG |

FIG. 32
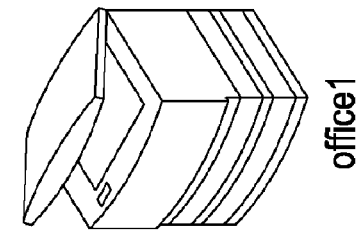
office1
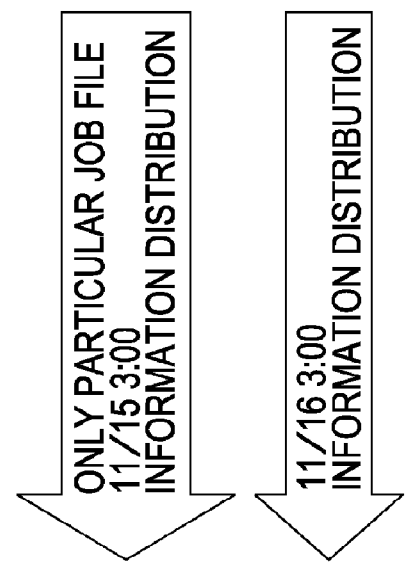
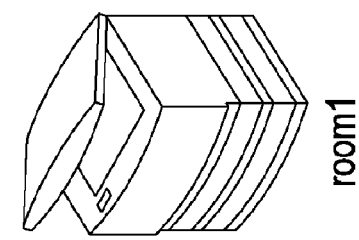
room1

IMAGE PROCESSING APPARATUS DISCLOSURE INFORMATION TRANSMISSION METHOD AND DISCLOSURE INFORMATION DISPLAY METHOD

BACKGROUND OF THE INVENTION

1. Field of the Invention

The present invention relates to an image processing apparatus, a disclosure information transmission method, and a disclosure information display method.

2. Description of the Related Art

A system in which multi-function peripherals are installed in meeting rooms and rooms in an office and the multi-function peripherals are connected via a network has been provided. With the above-described system, a user does not bring meeting materials in form of paper documents into the meeting room, but the user stores electronic data for the materials in the multi-function peripheral installed in the meeting room and operates a print processing in the meeting room (refer to Japanese Patent Application No. 2005-349451).

In this operation, the user uses the multi-function peripheral in the meeting room which is different from the usually used multi-function peripheral to store an image. Thus, an input error may occur and it takes some labor to store the same electronic data in a plurality of multi-function peripherals.

In order to eliminate such labor, a remote collaboration of BOX documents stored in multi-function peripherals has been proposed.

When the remote collaboration is carried out, a BOX document stored in a certain multi-function peripheral can be, for example, referred to or printed from another multi-function peripheral. Therefore, without storing the electronic data in the multi-function peripheral in the meeting room, the user stores the electronic data in the multi-function peripheral in the room and remotely accesses the electronic data from the multi-function peripheral in the meeting room, so that the document can be printed from the multi-function peripheral in the meeting room.

SUMMARY OF THE INVENTION

According to an embodiment of the present invention, an image processing apparatus includes a disclosure information setting unit configured to set disclosure information including disclosure target information related to an area of a storage unit and disclosure time information, a disclosure information transmission determination unit configured to determine, based on the disclosure time information, whether the disclosure information is transmitted to the disclosure target, and a disclosure information transmission unit configured to transmit the disclosure information to the disclosure target based on the disclosure target information when the disclosure information transmission determination unit determines that the disclosure information is transmitted to the disclosure target.

According to the above-described embodiment of the present embodiment, it is possible, for example, to easily select an image processing apparatus which stores data of an image processing target from an image processing apparatus which performs the image processing.

Other features of the present invention will be apparent from the following description taken in conjunction with the accompanying drawings, in which like reference characters designate the same or similar parts throughout thereof.

BRIEF DESCRIPTION OF THE DRAWINGS

FIG. 7 illustrates an attribute example.

FIG. 8C illustrates the setting of the BOX subjected to external disclosure.

FIG. 8D illustrates the setting of the BOX subjected to external disclosure.

FIG. 9 is a flowchart of a setting processing example for disclosure information.

FIG. 10 illustrates a disclosure information example in the multi-function peripheral.

FIG. 12 is a flowchart of a setting processing example of a disclosure information transmission interval day and a disclosure information transmission interval hour.

FIG. 13 illustrates examples of the disclosure information transmission interval day and the disclosure information transmission interval hour.

FIG. 16 illustrates a disclosure information example in the multi-function peripheral on the room side.

FIG. 19 is a flowchart of a setting processing example of the disclosure information display interval day and the disclosure information display interval hour.

FIG. 20 illustrates examples of the disclosure information display interval day and the disclosure information display interval hour.

FIG. 23C illustrates the display of the disclosure information.

FIG. 30 illustrates an expansion example of the attribute of FIG. 7.

FIG. 32 illustrates an expanded embodiment example.

DESCRIPTION OF THE EMBODIMENTS

Hereinafter, exemplary embodiments of the present invention will be described with reference to the drawings.

Figure 1:
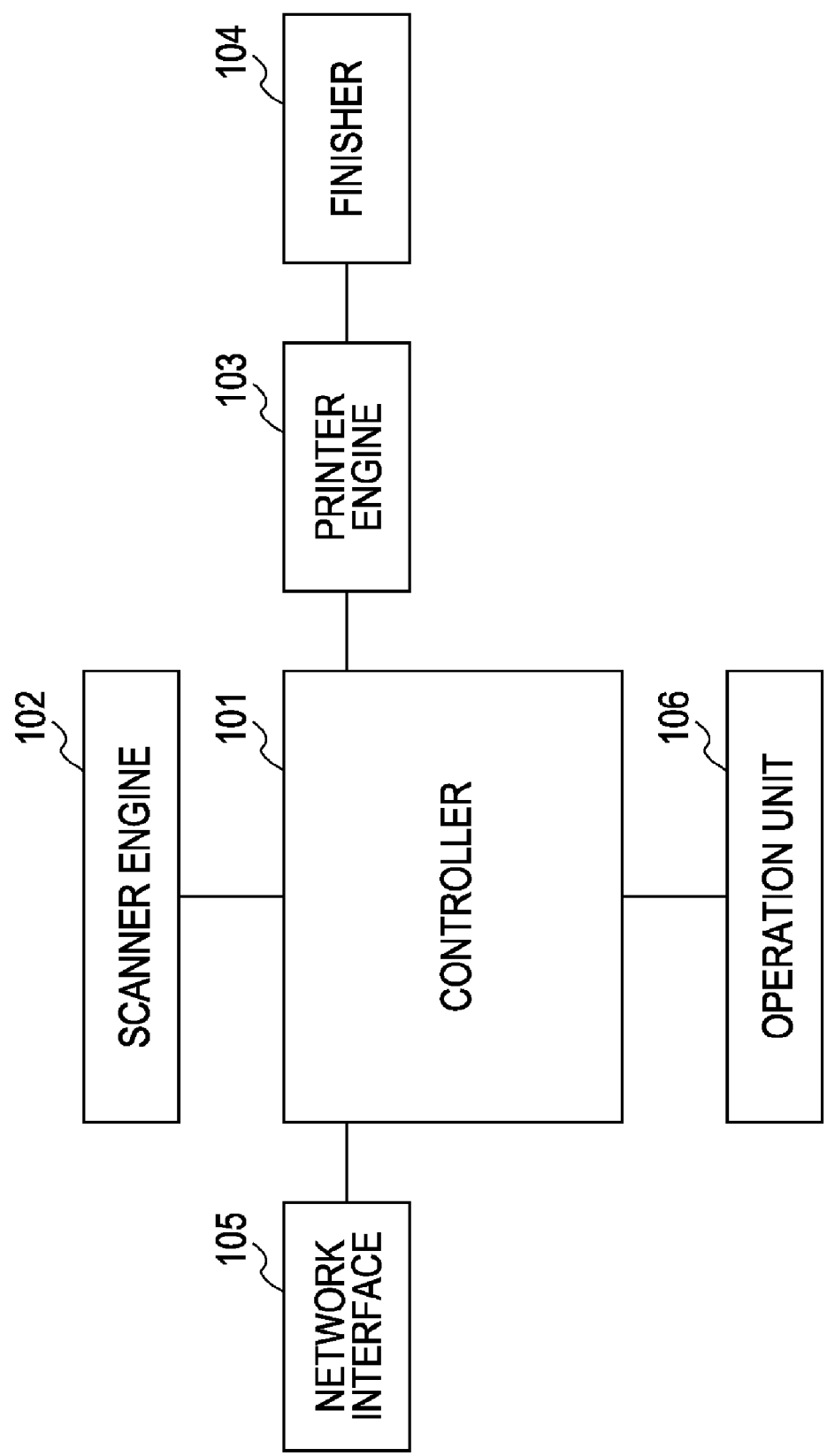
FIG. 1 illustrates a configuration example of a multi-function peripheral as an example of an image processing apparatus according to an embodiment of the present invention.

FIG. 1 illustrates an example of a configuration of a multi-function peripheral of an image processing apparatus according to an exemplary embodiment of the present invention.

Figure 3:
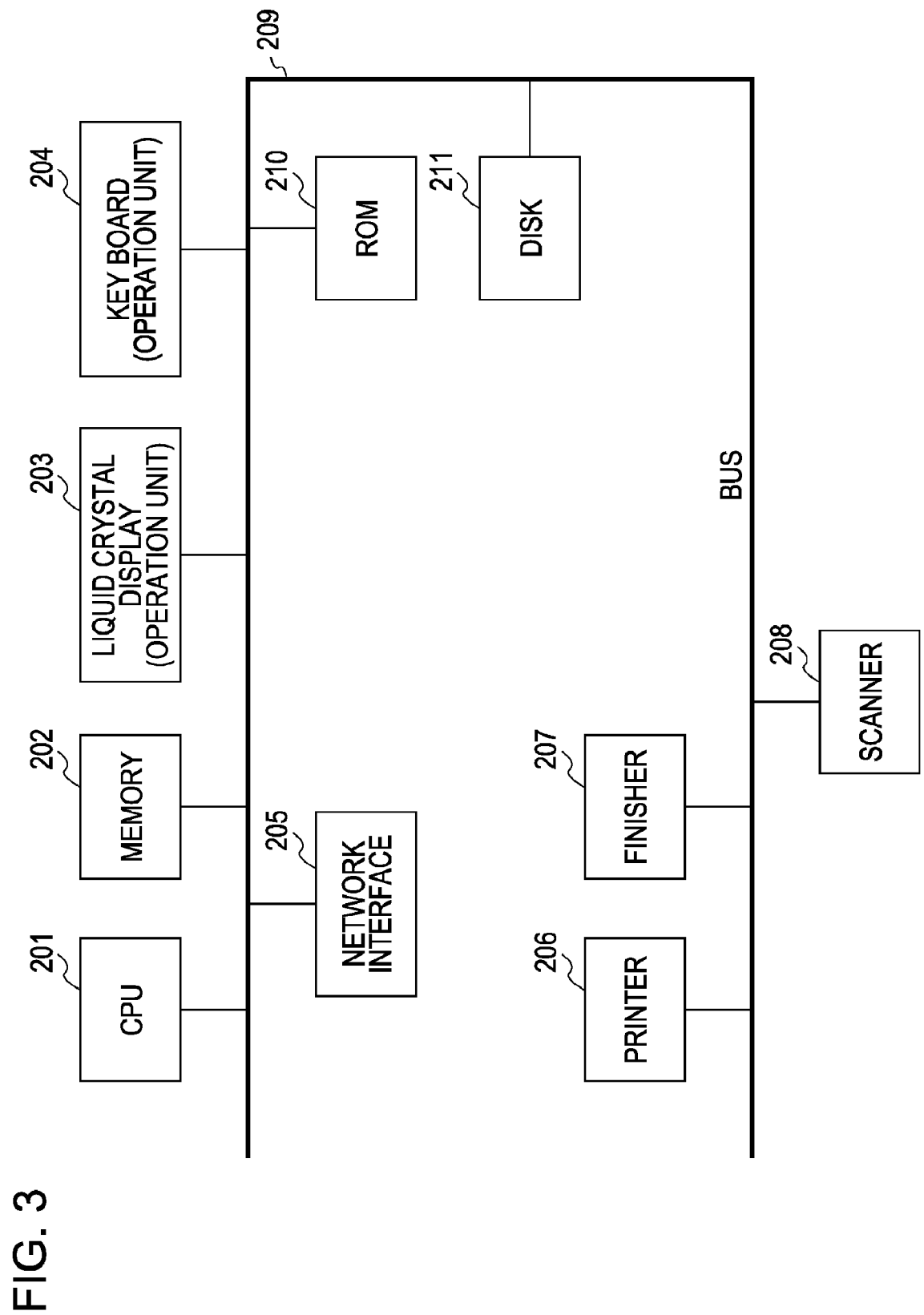
FIG. 3 illustrates a hardware configuration example of a multi-function peripheral.

In FIG. 1, a controller 101 controls the multi-function peripheral and includes a CPU 201, a memory 202, a ROM 210, and a Disk 211 illustrated in FIG. 3. A scanner engine 102 is controlled by the controller 101. In addition, a printer engine 103 is also controlled by the controller 101.

A finisher 104 is connected to the printer engine 103 and collects a plurality of pieces of recording media, e.g., paper, output from the printer engine 103 to perform a stable processing or a binding processing. The finisher 104 is also controlled by the controller 101.

A network interface 105 provides a bidirectional communication to the controller 101 through this interface. An operation unit 106 is composed of a liquid crystal display 203 and a key board 204 which are illustrated in FIG. 3. The operation unit 106 performs information display from the controller 101 and also transmits an instruction from a user to the controller 101.

Figure 2:
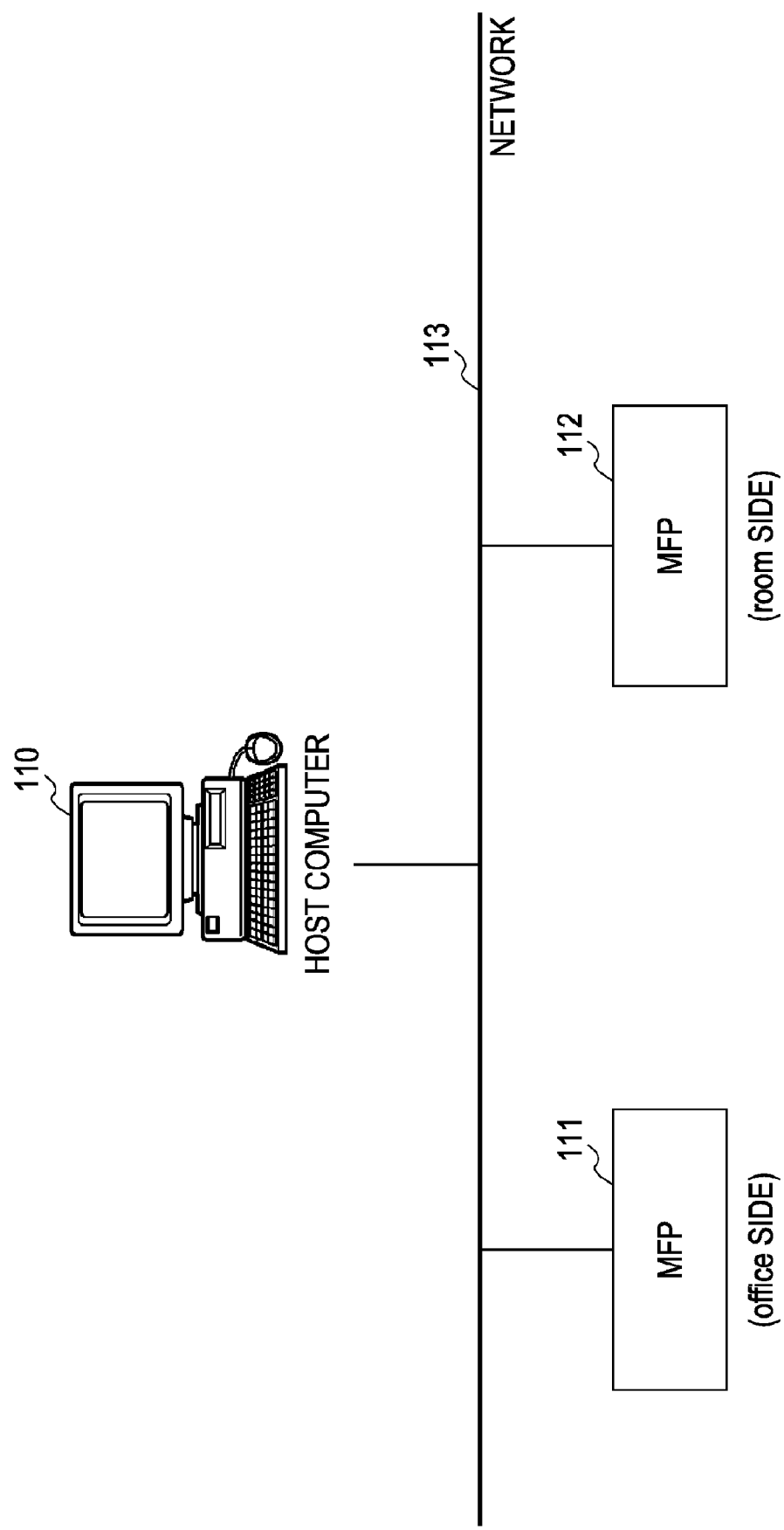
FIG. 2 illustrates a system configuration example.

FIG. 2 illustrates the configuration of a system configuration according to the present embodiment. As illustrated in FIG. 2, the multi-function peripheral (MFPs) 111 and 112 and a host computer 110 are connected via a network 113. MFPs 111 and 112 and the host computer 110 specify an IP address and a port number to connect to a data transmission destination, and perform data transmission by outputting IP packets.

For purposes of describing the present embodiment, MFP 111 will represent the MFP which is on the local (office) side and MFP 112 will represent the MFP which is on the remote (room) side.

FIG. 3 illustrates a hardware configuration example of an MFP according to the present embodiment. As previously described, the controller 101 includes the CPU 201, memory 202, ROM 210, and Disk 211, which are all connected via bus 209. Various programs and data pieces are stored in the Disk 211, which is a storage medium such as a hard disk drive or a floppy disk. The programs and data pieces are sequentially read to the memory 202 and executed by the CPU 201. The Disk 211 may be detachably attached to the MFP or built into the MFP. Furthermore, the programs stored in the Disk 211 may be downloaded from other MFPs, computers, etc.

As previously described, liquid crystal display 203 and key board 204 are part of the operation unit 106.

Network interface 205 is connected to the bus 209. The network interface 205 corresponds to the network interface 105 illustrated in FIG. 1. A communication using the network interface 205 is performed as the CPU 201 reads or writes the data from the network interface 205.

Furthermore, a printer 206, a finisher 207, and a scanner 208 are connected to the bus 209, and respectively correspond to the printer engine 103, the finisher 104, and the scanner engine 102 which are illustrated in FIG. 1. The CPU 201 performs data read and write operations via these engines to perform printing and scanning. The printer 206, the finisher 207, and the scanner 208 may individually exist as peripheral devices on the bus 209 instead of being arranged in an MFP, and the printer 206, the finisher 207, and the scanner 208 may be controlled by the controller 101 of the MFP.

Figure 4:
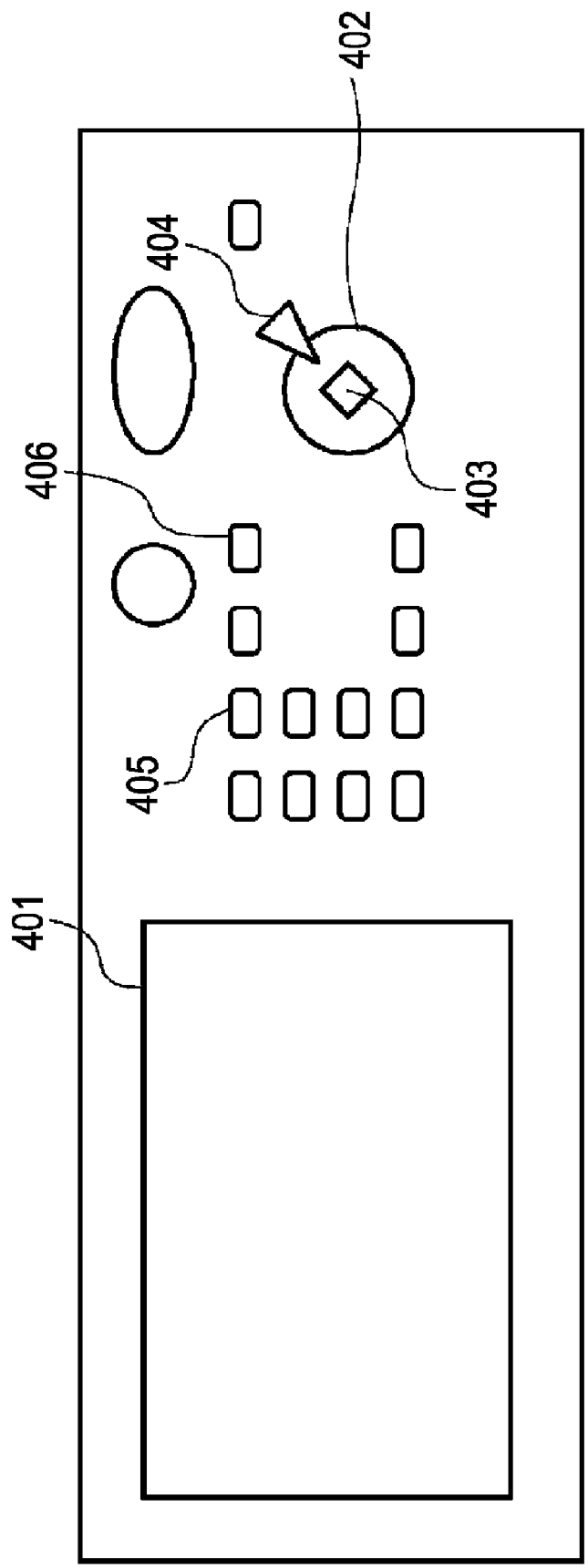
FIG. 4 illustrates a configuration example of an operation unit.

FIG. 4 illustrates a configuration example of the operation unit 106.

A touch panel sheet is affixed on a liquid crystal of a liquid crystal display unit 401, on which an operation screen for the system (MFP) and soft keys are displayed. When a displayed key is pressed, position information thereof is transmitted to the CPU 201.

A start key 402 is selected when a reading operation of an original image is started. In the center portion of the start key 402, LEDs 403 of two colors, e.g., green and red, are provided. These colors indicate whether a reading operation can be commenced or not.

A stop key 404 is used when the currently running operation is to be stopped. A set of ten keys 405 includes a numeral and character button group, and is used to instruct a setting of the number of copies to be printed, a screen switching of the liquid crystal display unit 401, etc. A user mode key 406 is used, for example, when an operation mode of a copying machine is set.

Figure 5:
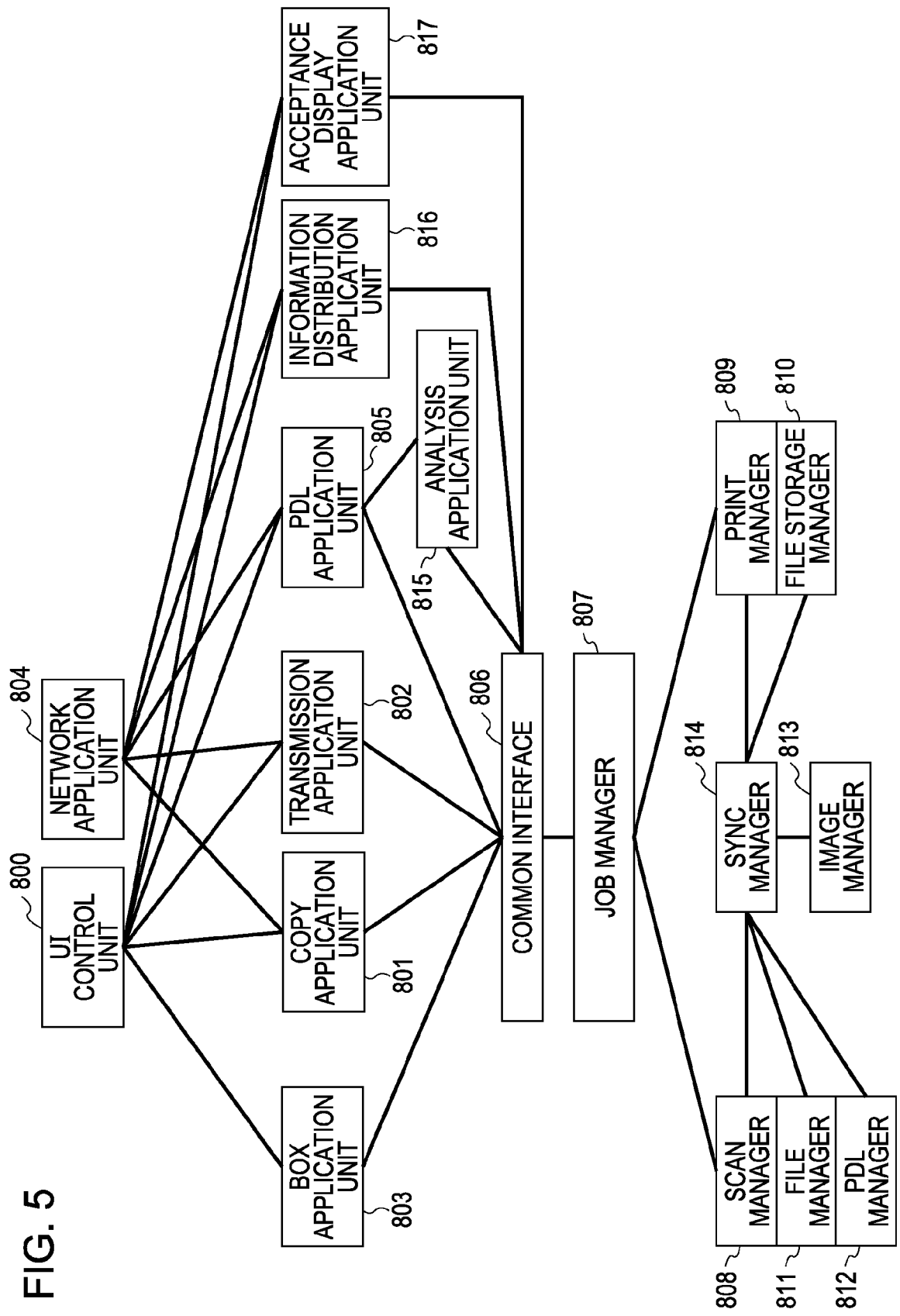
FIG. 5 illustrates a function configuration example of the multi-function peripheral.

FIG. 5 illustrates a function configuration (software configuration) example according to the present embodiment which is realized when the CPU 201 executes the various programs stored in the Disk 211.

A UI control unit 800 controls the operation unit 106. A copy application unit 801 executes the copy operation in response to an instruction from the UI control unit 800. A transmission application unit 802 executes the transmission operation in response to the instruction from the UI control unit 800. A BOX application unit 803 executes scan and print in response to the instruction from the UI control unit.

An information distribution application unit 816 performs processes including transmission of disclosure information performed by the MFP 111, acceptance of a transfer request, and transfer of a job file.

An acceptance display application unit 817 performs processes including display of disclosure information performed by the MFP 112 and transmission of the transfer request.

A PDL application unit 805 inputs a PDL print job in response to the PDL print data from a network application unit 804. A common interface 806 is a common interface part used for absorbing a machine relying part of the machine control part. A job manager 807 organizes job information received from the common interface and transmits the information to a document processing unit in a lower hierarchy.

The document processing unit is realized by a scan manager 808 and a print manager 809 in the case of a local copy, and realized by the scan manager 808 and a file storage manager 810 in the case of a remote copy transmission job or a transmission job. Also, the document processing unit is realized by a file manager 811 and the print manager 809 in the case of a remote copy reception job, and realized by a PDL manager 812 and the print manager 809 in the case of a PDL print such as LIPS or PostScript.

An image manager 813 realizes synchronization among the document managers and performs various image processings. A request about an image processing to the image manager 813 is performed by a sync manager 814. The image manager 813 also performs image processes at the time of scan and print and image file storage. An analysis application unit 815 analyzes and edits the job file output from the PDL application unit 805 and input the job to the common interface 806.

Figure 6:
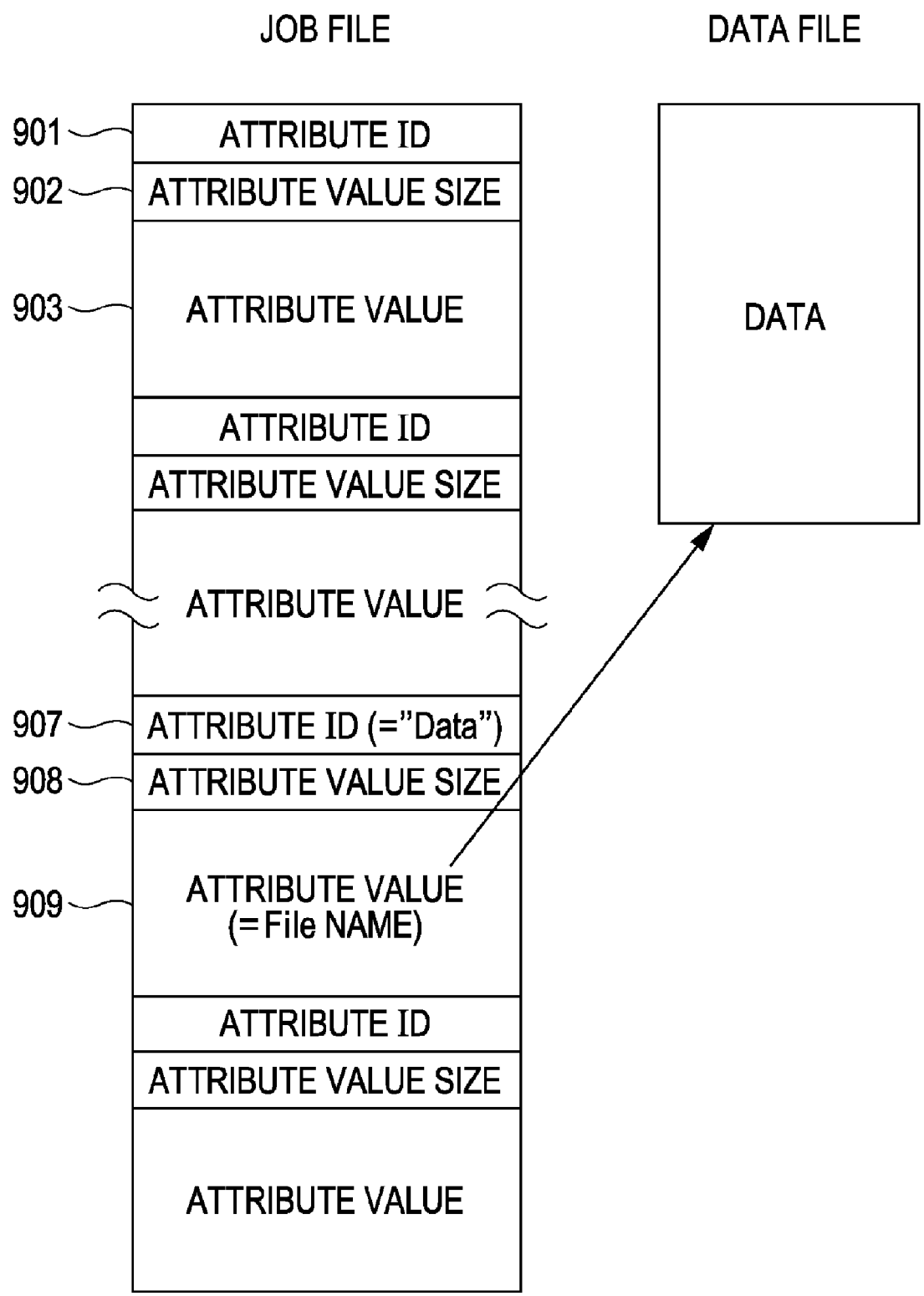
FIG. 6 illustrates an internal configuration of data which becomes an entity of a job (job file).

FIG. 6 illustrates an internal configuration of data which becomes an entity of a job (job file). The data illustrated in FIG. 6 is generated by the above-described applications 801, 802, 803, 805, 816, and 817 when an instruction to execute the job is issued from the UI control unit 800 or the network application unit 804. In the copy job, the copy application unit 801 is notified of the setting input from the operation unit 106, and based on the notified information, for example, the copy application unit 801 generates the data. In the PDL job, based on the information notified from the network application unit 804, for example, the PDL application unit 805 generates the data.

A substance of the job has a plurality of successive sets of an attribute ID 901, an attribute value size 902, and an attribute value 903. In a case where the job includes the data, as denoted by reference numerals 907, 908, and 909, a value representing the data as an attribute ID, a size of a file name as an attribute value, and a file name of a file storing the document data as an attribute value are stored. Examples of the attribute include, but are not limited to, a data format (a used PDL, etc.), the number of copies, cassette stages, and a finishing processing specification.

FIG. 7 illustrates an attribute example. An attribute ID 1001 represents an ID number of the attribute. A type ID 1002 represents a type of the ID (size). It is decided in such a manner that "1" refers to an undefined length and "2" refers to 1 byte. A value 1003 represents a possible range of value. A meaning 1004 represents a meaning of the attribute ID 1001. It is noted that the attributes listed in this table are examples and other various attributes exist. These values are set in the attribute ID 901, the attribute value size 902, the attribute value 903 illustrated in FIG. 6, and thus the job is formed.

Hereinafter, a description will be provided of a screen related to a setting of a BOX (BOX folder) subjected to external disclosure, which is displayed on the operation unit 106 of the MFP 111 with reference to FIGS. 8A to 8E.

Figure 8A:
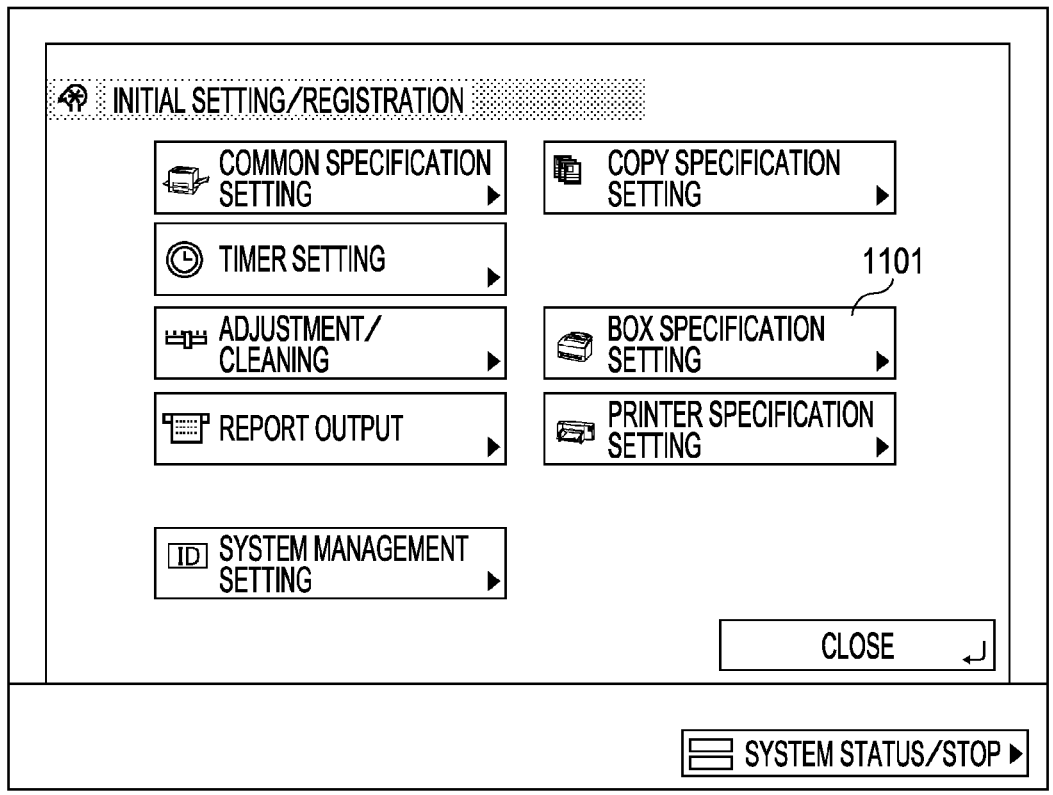
FIG. 8A illustrates a setting of a BOX subjected to external disclosure.

When the user mode key 406 is pressed, the UI control unit 800 displays a screen illustrated in FIG. 8A on the liquid crystal display unit 401 of the operation unit 106.

Figure 8B:
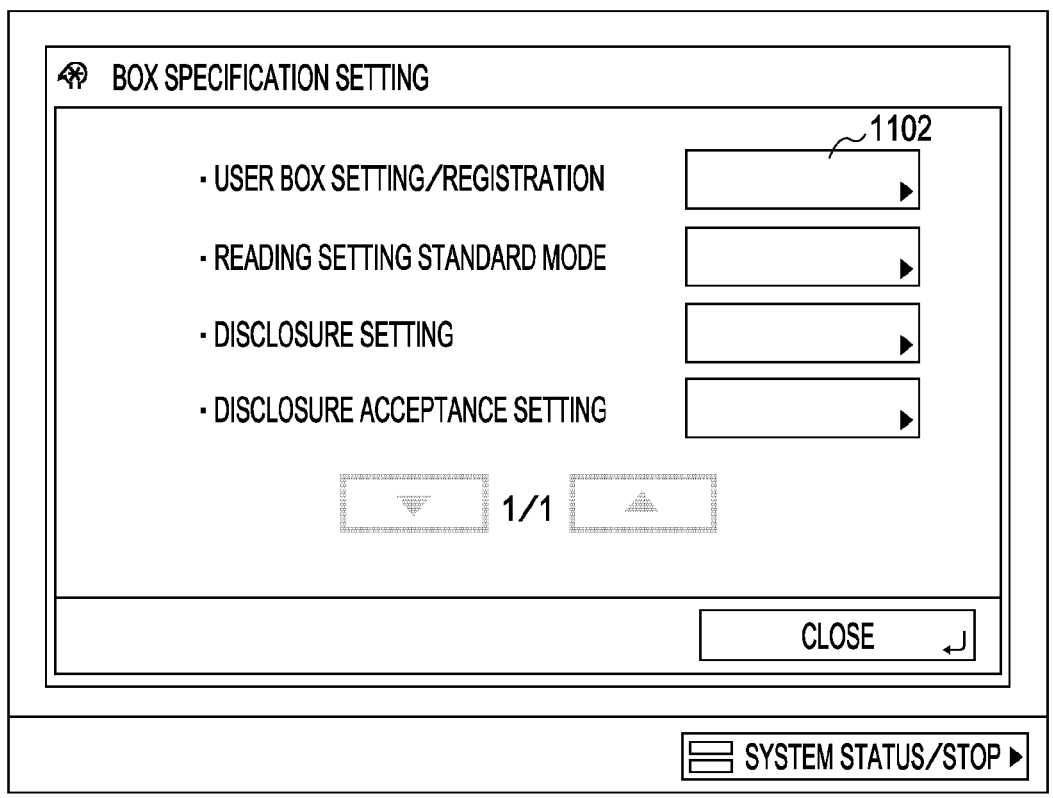
FIG. 8B illustrates the setting of the BOX subjected to external disclosure.

When a BOX specification button 1101 illustrated in FIG. 8A is pressed, the UI control unit 800 displays a screen illustrated in FIG. 8B. When a user BOX setting/registration button 1102 illustrated in FIG. 8B is pressed, the UI control unit 800 displays a screen illustrated in FIG. 8C. Buttons 1103 corresponding to all BOXes are displayed on the screen illustrated in FIG. 8C. By pressing a button of a BOX whose setting is to be changed, it is possible for a user to perform the BOX setting. When one of the buttons 1103 is pressed, the UI control unit 800 displays a screen illustrated in FIG. 8D. BOX name registration (setting), PIN setting, auto deletion time setting, and a disclosure setting button 1104 for performing disclosure setting are displayed on the screen illustrated in FIG. 8D. When the disclosure setting button 1104 is pressed, the UI control unit 800 displays a screen illustrated in FIG. 8E. A date setting button 1105, a time setting button 1106, and a disclosure target button 1107 are displayed on the screen illustrated in FIG. 8E. By pressing the date setting button 1105 and the time setting button 1106, it is possible for a user to set a starting date and time when the information is to be disclosed and an ending date and time, i.e., disclosure time information. Also, by pressing the disclosure target button 1107, a user can set the disclosure target of the disclosure information (disclosure target information).

Herein, the BOX refers to, for example, a predetermined area (folder or directory) allocated for each user of the memory 202 or the Disk 211.

FIG. 9 illustrates a flowchart of the setting processing example of the disclosure information. In step S11, the UI control unit 800 obtains the respective values of the start and end dates, the start and end times, and the disclosure target which are input (or set) via the screen illustrated in FIG. 8E (a disclosure information setting screen).

Subsequently, in step S12, the UI control unit 800 stores the values obtained in step S11 in the memory 202 or the Disk 211 in the MFP 111 as disclosure information (disclosure information setting). More specifically, the UI control unit 800 stores the disclosure information in a table illustrated in FIG. 10 which is stored in the memory 202 or the Disk 211 in the MFP 111.

Figure 8E:
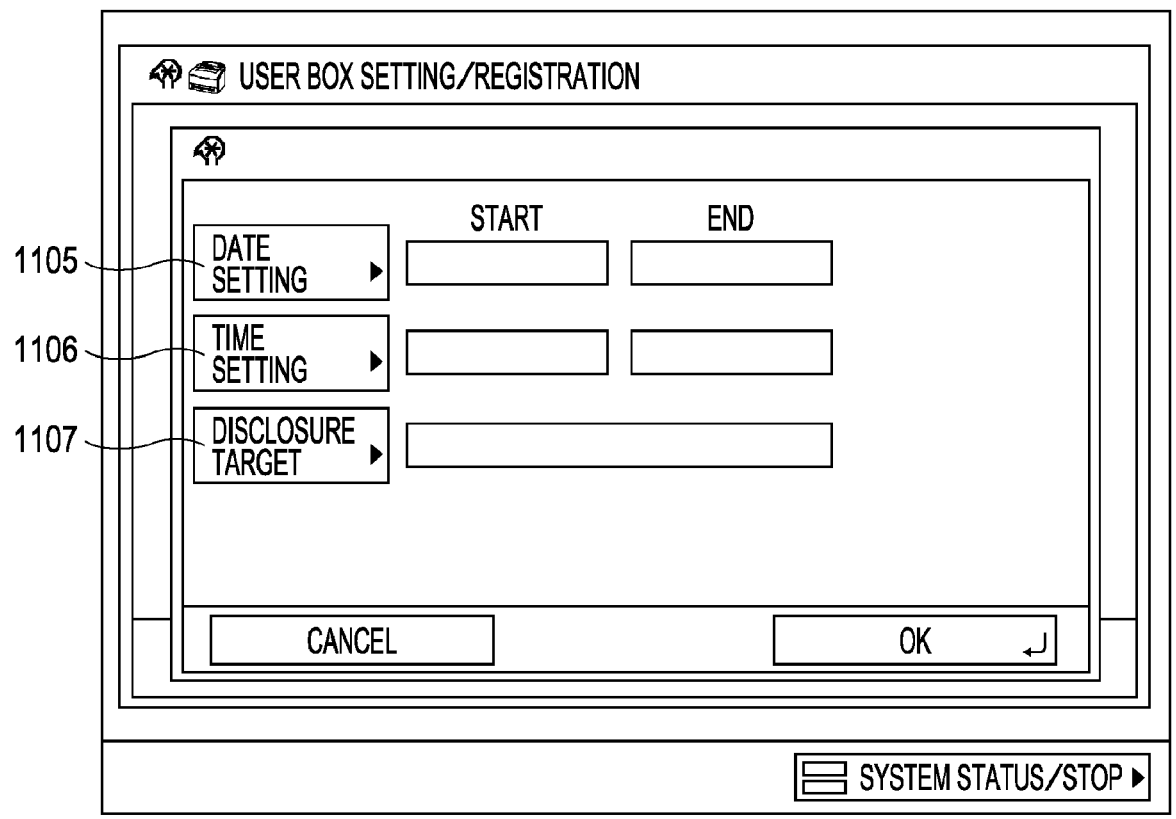
FIG. 8E illustrates the setting of the BOX subjected to external disclosure.

A default of a disclosure completed column is "No". When the disclosure information is transmitted to the disclosure target, the value is changed into "Yes" by the information distribution application unit 816. When the user finishes the disclosure information setting, the screen of FIG. 8E is returned to the screen of FIG. 8D. A period is displayed in a disclosure setting column on the screen of FIG. 8D. Thus, after the settings are performed, a user can confirm the start date, the end date, the start time, and the end time related to the disclosure information.

Hereinafter, a description will be provided of a screen related to the disclosure setting for the setting information (disclosure information) which is displayed on the operation unit 106 of the MFP 111 with reference to FIGS. 11A and 11B.

Figure 11A:
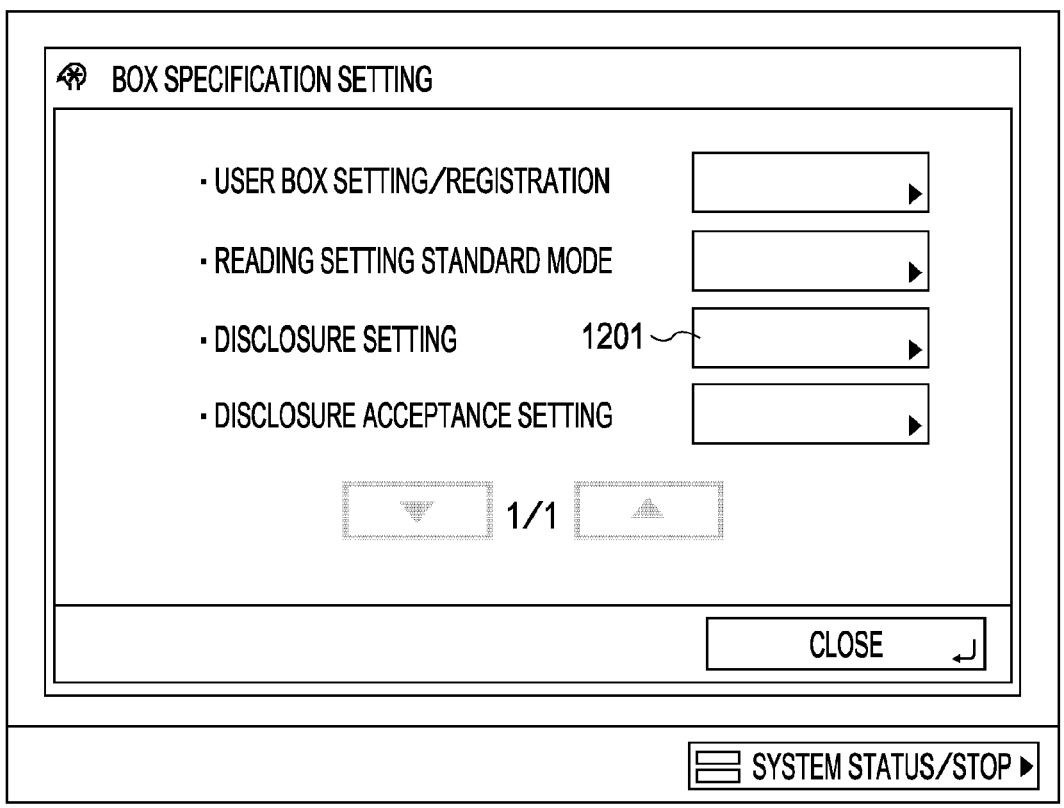
FIG. 11A illustrates a disclosure setting for setting information.

When the user mode key 406 is pressed, the UI control unit 800 displays a screen illustrated in FIG. 11A on the liquid crystal display unit 401 of the operation unit 106. When a disclosure setting button 1201 illustrated in FIG. 11A is pressed, the UI control unit 800 displays a screen illustrated in FIG. 11B.

Figure 11B:
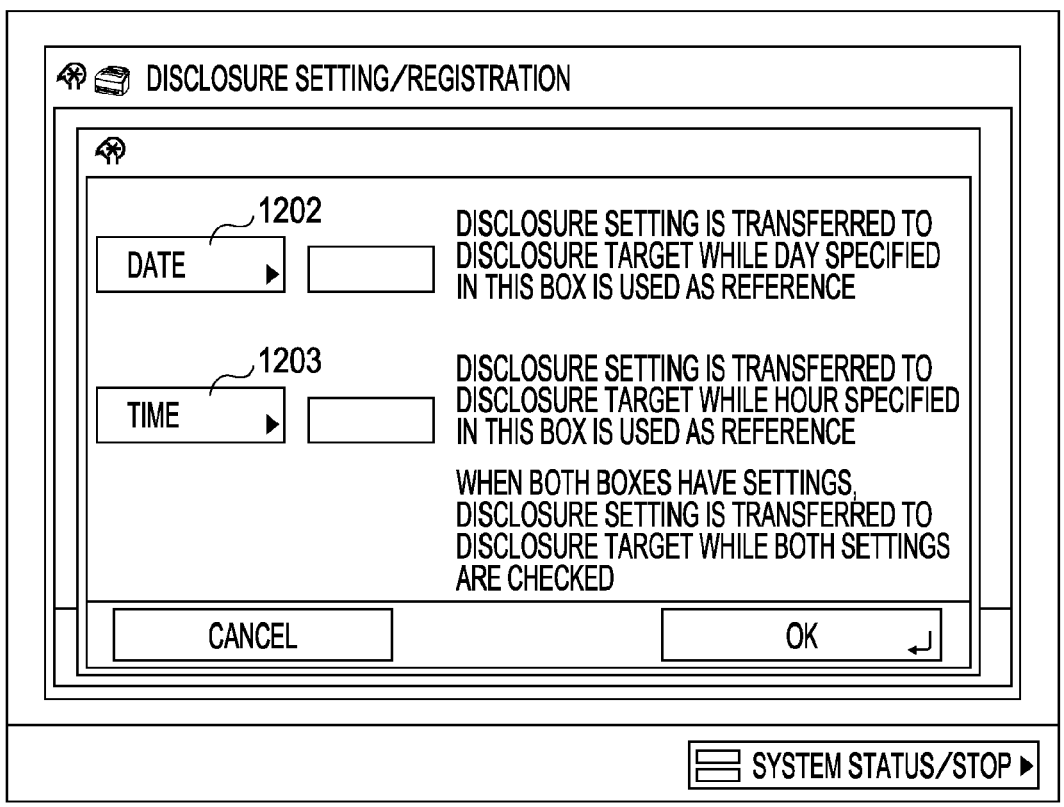
FIG. 11B illustrates the disclosure setting for the setting information.

By using the screen illustrated in FIG. 11B, a user can input a day interval and an hour interval. The day can be input via date button 1202, while the hour can be input via time button 1203. The values input (set) via the screen illustrated in FIG. 11B are stored in the memory 202 or the Disk 211 in the MFP 111 as a disclosure information transmission interval day and a disclosure information transmission interval hour.

The disclosure information transmission interval day and the disclosure information transmission interval hour are information used for determining a timing for the MFP 111 to transmit the disclosure information to the disclosure target.

Next, a setting processing example of the disclosure information transmission interval day and the disclosure information transmission interval hour will be described with reference to a flowchart of FIG. 12.

In step S21, the UI control unit 800 obtains the respective input values of the date and the time which are input (or set) via the screen illustrated in FIG. 11B. Subsequently, in step S22, the UI control unit 800 saves the values obtained in step S21 as the disclosure information transmission interval day and the disclosure information transmission interval hour in the memory 202 or the Disk 211 in the MFP 111 (transmission interval time information setting). More specifically, the UI control unit 800 stores the disclosure information transmission interval day and the disclosure information transmission interval hour in a table illustrated in FIG. 13, which is stored in the memory 202 or the Disk 211 in the MFP 111.

Figure 14:
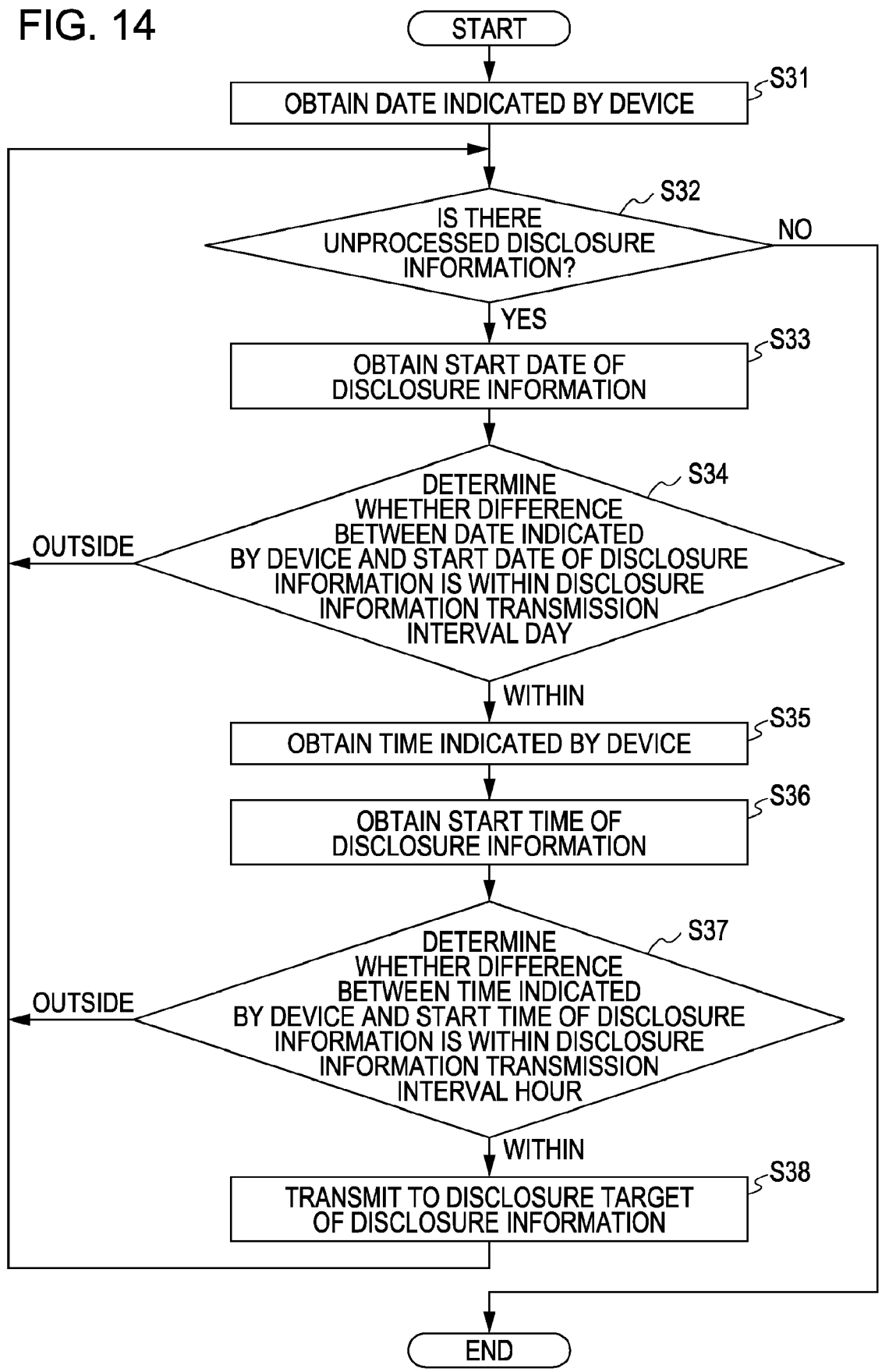
FIG. 14 is a flowchart of a disclosure information transmission processing example for the MFP on the office side.

FIG. 14 is a flowchart of a disclosure information transmission processing example for the MFP 111.

The processing illustrated in FIG. 9 is performed, and the disclosure information is newly added in the table illustrated in FIG. 10 and the processing illustrated in FIG. 14 is executed at every certain time interval.

In step S31, the information distribution application unit 816 obtains a date from a timer, etc. of the MFP 111.

In step S32, the information distribution application unit 816 searches the processing columns in the table illustrated in FIG. 10 to confirm whether there is an item "unprocessed". When there is no item "unprocessed", the information distribution application unit 816 sets all the processing columns "unprocessed" to end the processing illustrated in FIG. 14. When there is an item "unprocessed", the process proceeds to step S33.

In step S33, the information distribution application unit 816 obtains a start time of disclosure information whose processing column is set as "unprocessed".

In step S34, the information distribution application unit 816 determines whether a difference between the date indicated by the device which is obtained in step S31 and the start time of the disclosure information obtained in step S33 is within the disclosure information transmission interval day illustrated in FIG. 13 (disclosure information transmission determination).

When the information distribution application unit 816 determines that the above-described difference is outside the disclosure information transmission interval day, the information distribution application unit 816 sets the processing column of the above-described disclosure information as "processed", and the flow returns to the processing in step S32. On the other hand, when the information distribution application unit 816 determines that the above-described difference is within the disclosure information transmission interval day, the flow proceeds to step S35.

In step S35, the information distribution application unit 816 obtains a time from the timer, etc. of the MFP 111.

In step S36, the information distribution application unit 816 obtains a start time of the above-described disclosure information.

In step S37, the information distribution application unit 816 determines whether a difference between the time indicated by the MFP 111, which is obtained in step S35 and the start time of the disclosure information which is obtained in step S36, is within the disclosure information transmission interval hour illustrated in FIG. 13 (disclosure information transmission determination).

When the information distribution application unit 816 determines that the above-described difference is outside the disclosure information transmission interval hour, the information distribution application unit 816 sets the processing column of the above-described disclosure information as "processed", and the flow returns to the processing in step S32. On the other hand, if the information distribution application unit 816 determines that the above-described difference is within the disclosure information transmission interval hour, the flow proceeds to step S38.

In step S38, the information distribution application unit 816 transmits the disclosure information of the processing target to the disclosure target, where the disclosure information includes the BOX number, the start date, the end date, the start time, the end time, and the disclosure source. Then, the information distribution application unit 816 changes the disclosed column of the above-described disclosure information to "Yes" and also changes the processing column to "processed". After that, the flow returns to the processing in Step S32. As long as there is disclosure information whose processing column is set as "unprocessed", the information distribution application unit 816 continues the processing in step S33 and the subsequent steps.

Figure 15:
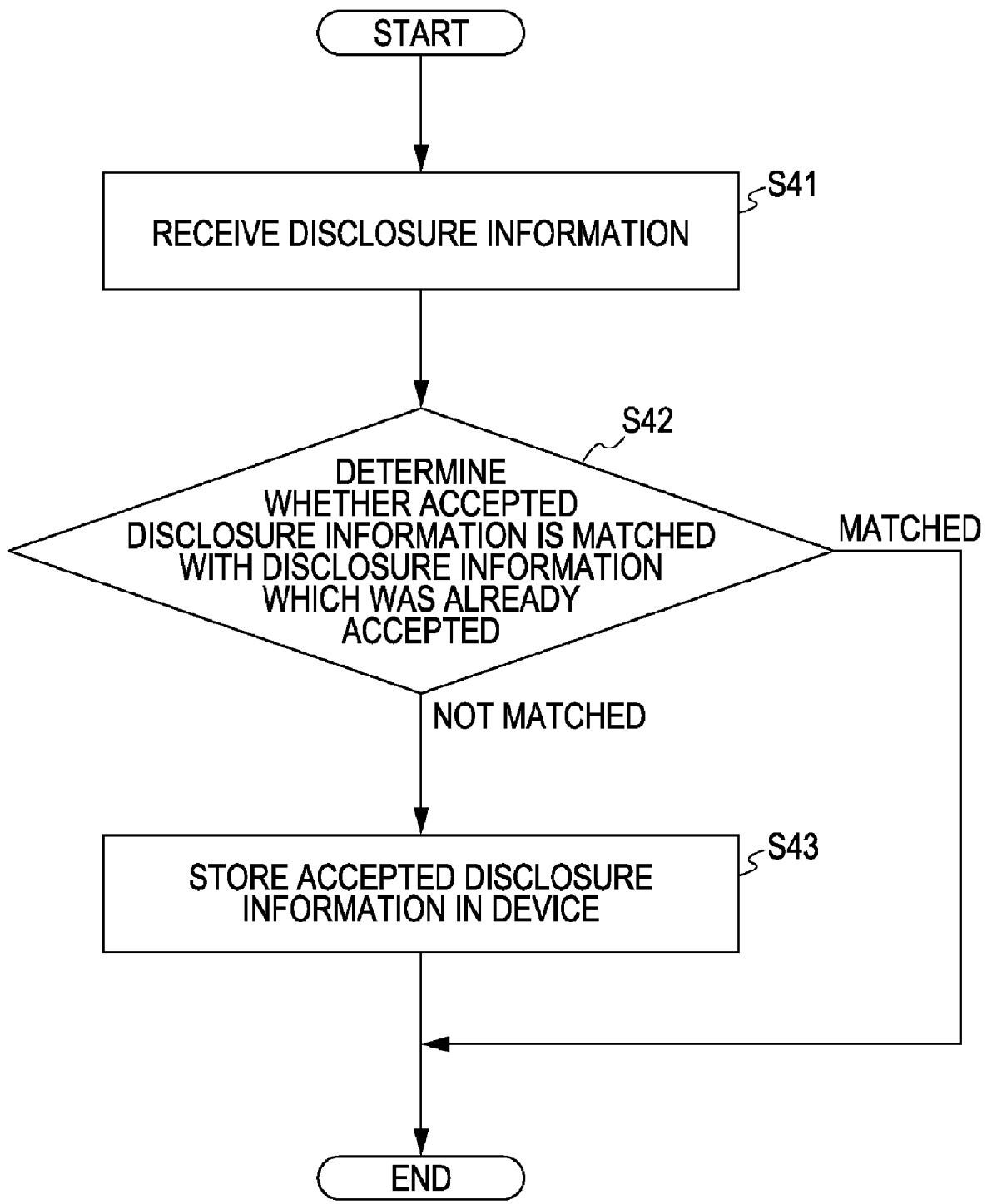
FIG. 15 is a flowchart of a disclosure information transmission processing example for the MFP on the room side.

FIG. 15 is a flowchart of a disclosure information transmission processing example for the MFP 112.

In step S41, the acceptance display application unit 817 receives, for example, disclosure information from the MFP 111 (disclosure information reception).

Subsequently, in step S42, the acceptance display application unit 817 determines whether the disclosure information received in step S41 is matched with the disclosure information already stored in the memory 202 or the Disk 211 in the MFP 112.

When the acceptance display application unit 817 determines that the disclosure information pieces are matched with each other, the acceptance display application unit 817 discards the disclosure information received in step S41 and the processing in FIG. 15 ends. On the other hand, if the acceptance display application unit 817 determines that the disclosure information pieces are not matched with each other, the flow proceeds to step S43.

In step S43, the acceptance display application unit 817 stores the disclosure information received in step S41 in a table illustrated in FIG. 16, which is stored in the memory 202 or the Disk 211 in the MFP 112.

FIG. 16 illustrates a disclosure information example in the MFP 112. More specifically, the acceptance display application unit 817 stores the start date, the end date, the start time, and the end time included in the received disclosure information in the table illustrated in FIG. 16, and further stores information indicating a display and information indicating a processing in the table illustrated in FIG. 16. The information indicating the display can hold a status of "Yes" or "No", and its default is "No". This information is referred to and changed in a processing which is described below by the acceptance display application unit 817. Information indicating the processing can hold a status of "unprocessed" or "processed", and its default is "unprocessed". This information is also referred to and changed in the processing which will be described below by the acceptance display application unit 817.

Hereinafter, a description will be provided of a screen related to a storage of an image, which is displayed on the operation unit 106 of the MFP 111, with reference to FIGS. 17A and 17B.

Figure 17A:
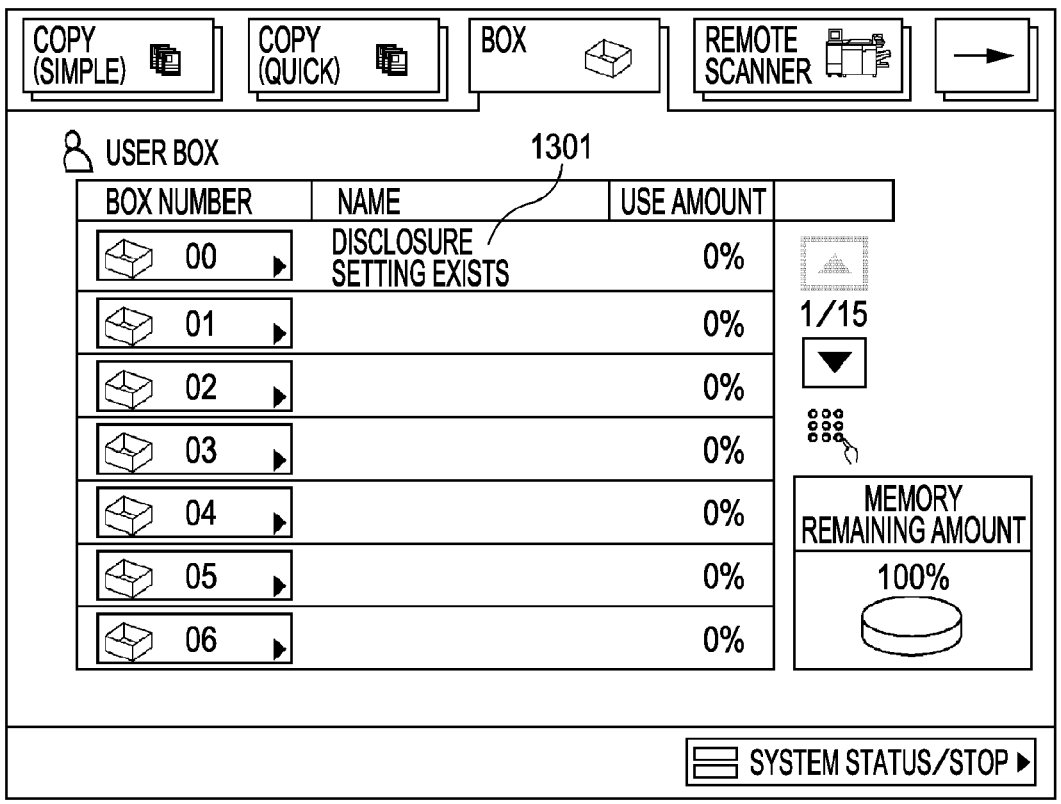
FIG. 17A illustrates storage of an image.
Figure 17B:
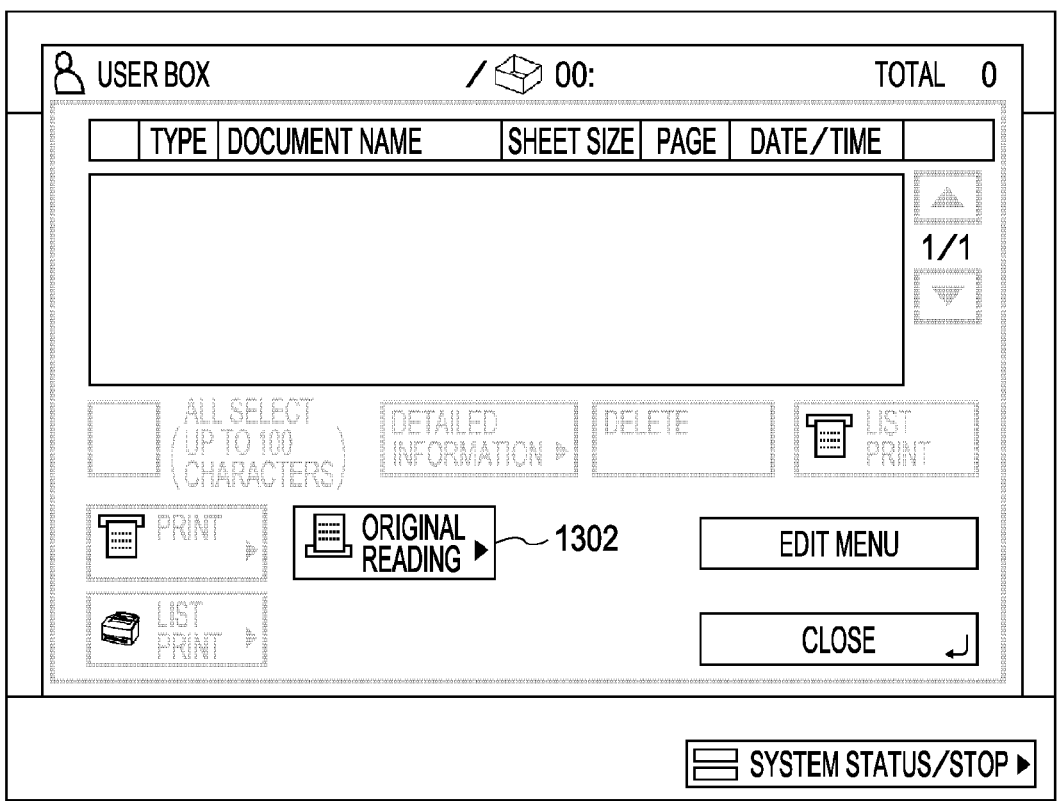
FIG. 17B illustrates the storage of the image.

In a case where a BOX having a BOX number 00 (No. 0) is specified as a BOX to be disclosed, the UI control unit 800 performs a display indicating that the disclosure setting is marked in a column of a name of the BOX No. 0, as illustrated in FIG. 17A. With this configuration, a user can confirm that the BOX is the BOX (BOX folder) set to be disclosed. When the BOX number 00 is pressed, the UI control unit 800 displays a screen illustrated in FIG. 17B.

When the user presses an original reading button 1302, the UI control unit 800 stores the selected images, etc. in the specified BOX (in the example of this drawing, the BOX having the BOX number 00). It is noted that the UI control unit 800 stores the image in the BOX in a file job format. In addition, a user can also input the images into the BOX from the host computer 110.

Hereinafter, a description will be provided of a screen related to a display setting for disclosure information, which is displayed on the operation unit 106 of the MFP 112, with reference to FIGS. 18A and 18B.

Figure 18A:
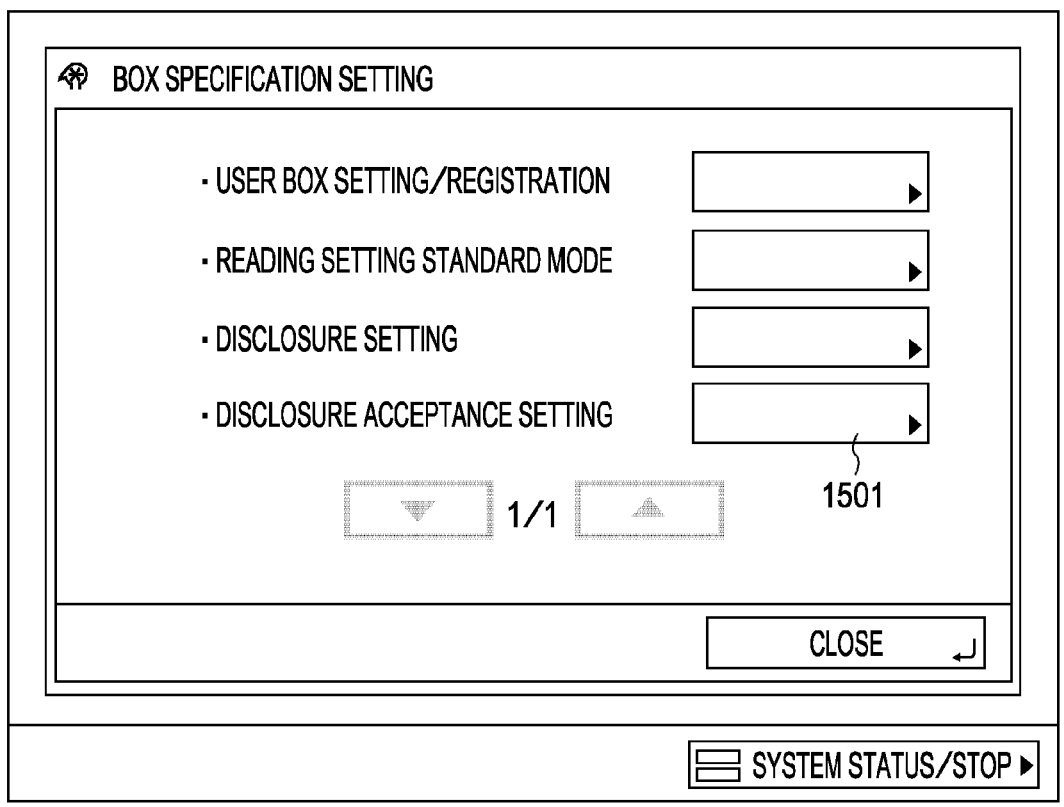
FIG. 18A illustrates a display setting for disclosure information.

When the user mode key 406 is pressed, the UI control unit 800 displays the screen illustrated in FIG. 18A on the liquid crystal display unit 401 of the operation unit 106. When a disclosure acceptance button 1501 illustrated in FIG. 18A is pressed, the UI control unit 800 displays the screen illustrated in FIG. 18B.

Figure 18B:
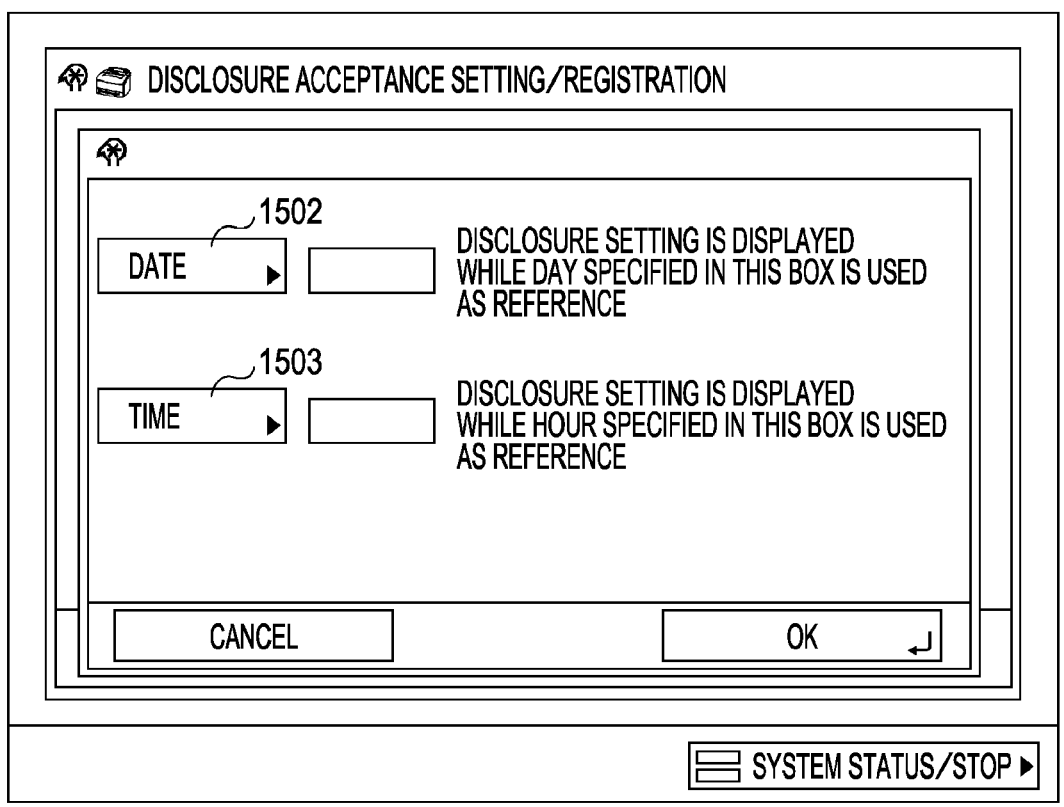
FIG. 18B illustrates the display setting for the disclosure information.

By using the screen illustrated in FIG. 18B, a user can input the day interval and the time interval. By pressing a date button 1502, the user can input the day. By pressing a time button 1503, a user can input the hour. The values which are input (or set) via the screen illustrated in FIG. 18B are stored in the memory 202 or the Disk 211 in the MFP 112 as a disclosure information display interval day and a disclosure information display interval hour.

The disclosure information display interval day and the disclosure information display interval hour are information used for determining a timing at which the MFP 112 displays the disclosure information on the operation unit 106.

Next, a setting processing example of the disclosure information display interval day and the disclosure information display interval hour will be described with reference to a flowchart of FIG. 19.

In step S51, the UI control unit 800 obtains the respective input values of the data and the time which are input (or set) via the screen illustrated in FIG. 18B.

Subsequently, in step S52, the UI control unit 800 stores the values obtained in step S51 as the disclosure information display interval day and the disclosure information display interval hour in the memory 202 or the Disk 211 in the MFP 112 (display interval time information setting). More specifically, the UI control unit 800 stores the disclosure information display interval day and the disclosure information display interval hour in a table illustrated in FIG. 20, which is stored in the memory 202 or the Disk 211 in the MFP 112.

Figure 21:
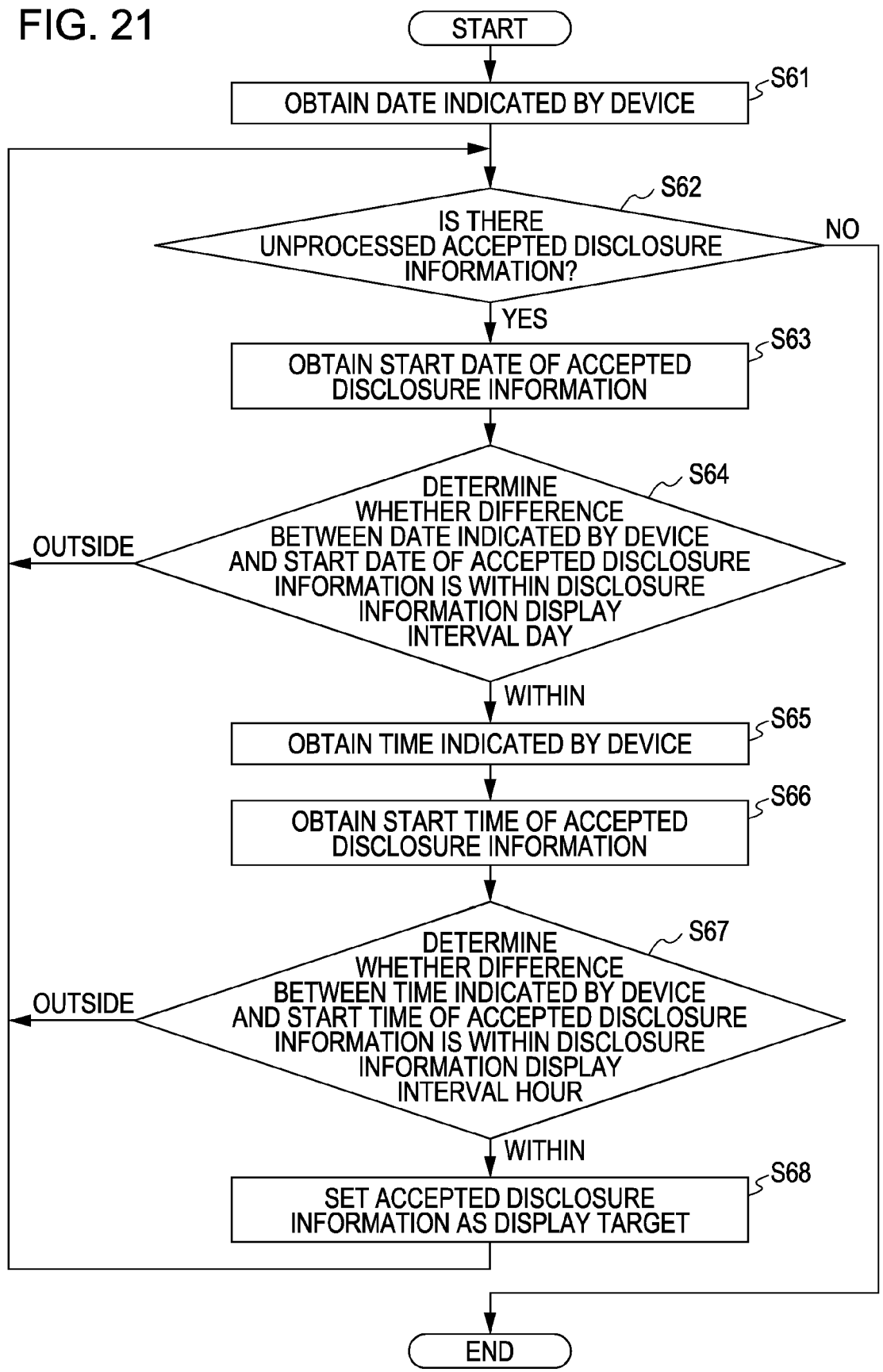
FIG. 21 is a flowchart of an accepted information display processing example in the MFP on the room side.

FIG. 21 is a flowchart of an accepted information display processing example in the MFP 112.

The processing illustrated in FIG. 15 is performed, and the disclosure information is newly added to the table illustrated in FIG. 16 and the processing illustrated in FIG. 21 is executed at every certain time interval.

In step S61, the acceptance display application unit 817 obtains the date from the timer of the MFP 111.

In step S62, the acceptance display application unit 817 searches the processing columns in the table illustrated in FIG. 16 to confirm whether there is an item "unprocessed". When there is no item "unprocessed", the acceptance display application unit 817 sets all the processing columns "unprocessed" and the processing illustrated in FIG. 21 ends. When there is an item "unprocessed", the process proceeds to step S63.

In step S63, the acceptance display application unit 817 obtains a start date of the disclosure information whose processing column is set as "unprocessed".

In step S64, the acceptance display application unit 817 determines whether a difference between the date indicated by the MPF 111 obtained in step S61 and the start date of the disclosure information which is obtained in step S63 is within the disclosure information display interval day illustrated in FIG. 20 (display target determination).

When the acceptance display application unit 817 determines that the above-described difference is outside the disclosure information display interval day, the acceptance display application unit 817 sets the processing column of the above-described disclosure information as "processed", and the flow returns to the processing in step S62. On the other hand, when the acceptance display application unit 817 determines that the above-described difference is within the disclosure information display interval day, the flow proceeds to step S65.

In Step S65, the acceptance display application unit 817 obtains a time from the timer of the MFP 112. In step S66, the acceptance display application unit 817 obtains a start time of the above-described disclosure information.

In step S67, the acceptance display application unit 817 determines whether a difference between the time indicated by the MFP 112 which is obtained in step S65 and the start time of the disclosure information which is obtained in step S66 is within the disclosure information display interval hour illustrated in FIG. 20 (display target determination).

When the acceptance display application unit 817 determines that the above-described difference is outside the disclosure information display interval hour, the acceptance display application unit 817 sets the processing column of the above-described disclosure information as "processed", and the flow returns to the processing in Step S62. On the other hand, when the acceptance display application unit 817 determines that the above-described difference is within the disclosure information display interval hour, the flow proceeds to step S68.

In step S68, in order to set the disclosure information of the processing target as the display target, the acceptance display application unit 817 changes the display column into "Yes", and also changes the processing column into "processed". After that, the flow returns to step S62, and the acceptance display application unit 817 continues the processing in step S63 and the subsequent steps as long as there is disclosure information whose processing column is set as "unprocessed".

Figure 22:
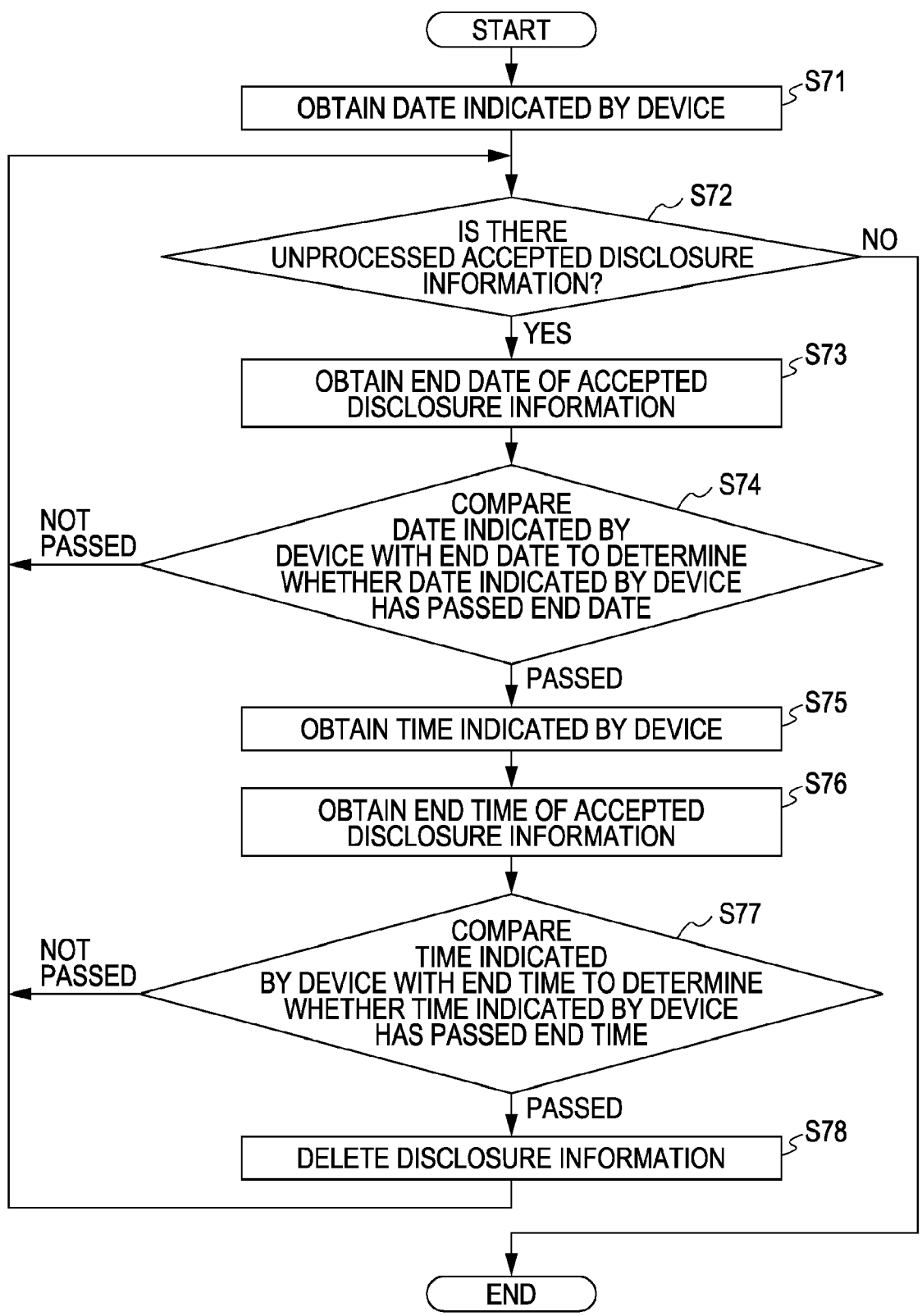
FIG. 22 is a flowchart of a disclosure information deletion processing in the MFP on the room side.

FIG. 22 is a flowchart of a disclosure information deletion processing in the MFP 112. Each time the date is changed, the processing illustrated in FIG. 22 is executed.

In step S71, the acceptance display application unit 817 obtains a date from the timer of the MFP 111.

In step S72, the acceptance display application unit 817 searches the processing columns in the table illustrated in FIG. 16 to confirm whether there is an item "unprocessed". When there is no "unprocessed" item, the acceptance display application unit 817 sets all processing columns as "unprocessed", and the processing illustrated in FIG. 22 ends. When there is an "unprocessed" item, the process proceeds to step S73.

In Step S73, the acceptance display application unit 817 obtains an end date of the disclosure information whose processing column is set as "unprocessed".

In Step S74, the acceptance display application unit 817 compares the date indicated by the MFP 111 which is obtained in step S71 with the end data of the disclosure information which is obtained in step S73 to determine whether the date indicated by the MFP 111 has passed the end date of the disclosure information.

When the acceptance display application unit 817 determines that the date indicated by the MFP 111 has not yet passed the end date of the disclosure information, the acceptance display application unit 817 sets the processing column of the above-described disclosure information as "processed", and the flow returns to step S72. On the other hand, when the acceptance display application unit 817 determines that the date indicated by the MFP 111 has passed the end date of the disclosure information, the process proceeds to step S75.

In Step S75, the acceptance display application unit 817 obtains a time from the timer of the MFP 112. In step S76, the acceptance display application unit 817 obtains an end time of the above-described disclosure information.

In step S77, the acceptance display application unit 817 compares the time indicated by the MFP 112 which is obtained in step S75 with the end time of the disclosure information which is obtained in step S76 to determine whether the time indicated by the MFP 112 has passed the end time of the disclosure information.

When the acceptance display application unit 817 determines that the time indicated by the MFP 112 has not yet passed the end time of the disclosure information, the acceptance display application unit 817 sets the processing column of the above-described disclosure information as "processed", and the process returns to step S72. On the other hand, when the acceptance display application unit 817 determines that the time indicated by the MFP 112 has passed the end time of the disclosure information, the process proceeds to step S78.

In step S78, the acceptance display application unit 817 deletes the disclosure information of the processing target. After that, the flow returns to step S72, and as long as there is disclosure information whose processing column is set as "unprocessed", the acceptance display application unit 817 continues the processing in step S73 and the subsequent steps.

Hereinafter, a description will be provided, with reference to FIGS. 23A to 23C, of a screen related to a display of the disclosure information set as the display target, which is displayed on the operation unit 106 of the MFP 112.

Figure 23A:
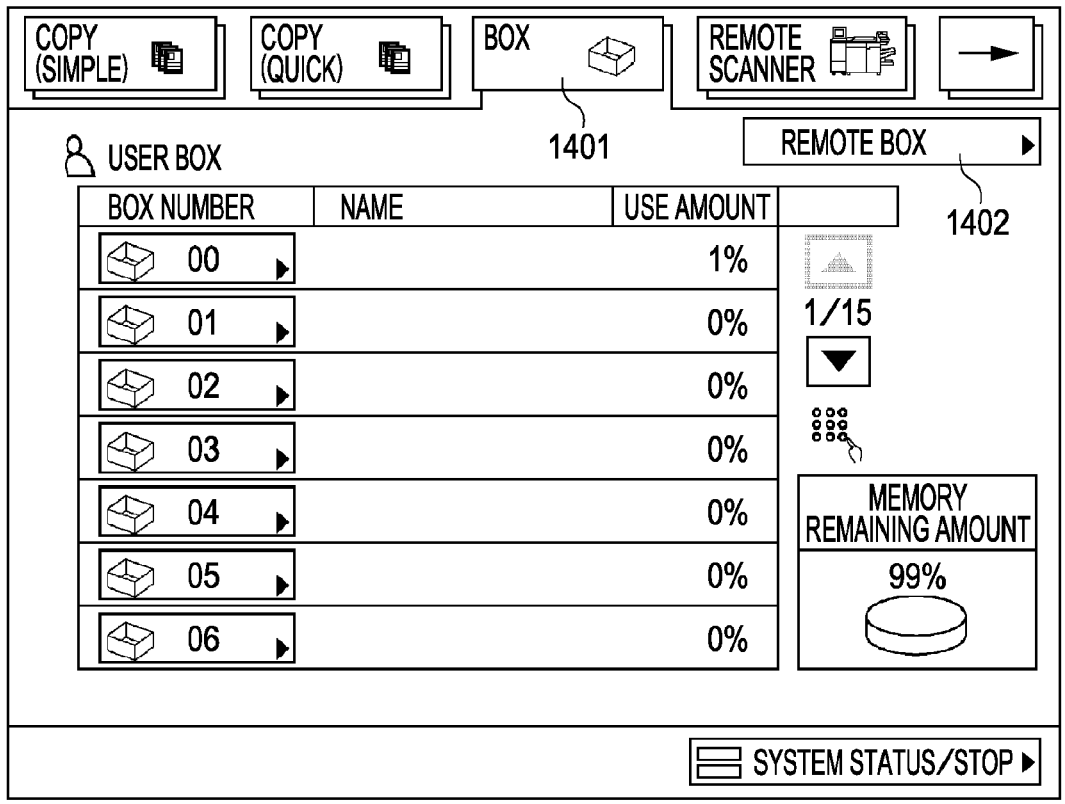
FIG. 23A illustrates a display of disclosure information.

FIG. 23A illustrates a display of the disclosure information (Part 1). When a BOX tab 1401 is pressed, the UI control unit 800 displays a screen illustrated in FIG. 23A. From this screen, for example, a user can instruct printing of a BOX document saved in the BOX inside the MFP 112.

In addition, as illustrated in FIG. 23A, a remote box transition button 1402 is provided. When the user presses the remote box transition button 1402, the UI control unit 800 displays a remote box screen illustrated in FIG. 23B.

Figure 23B:
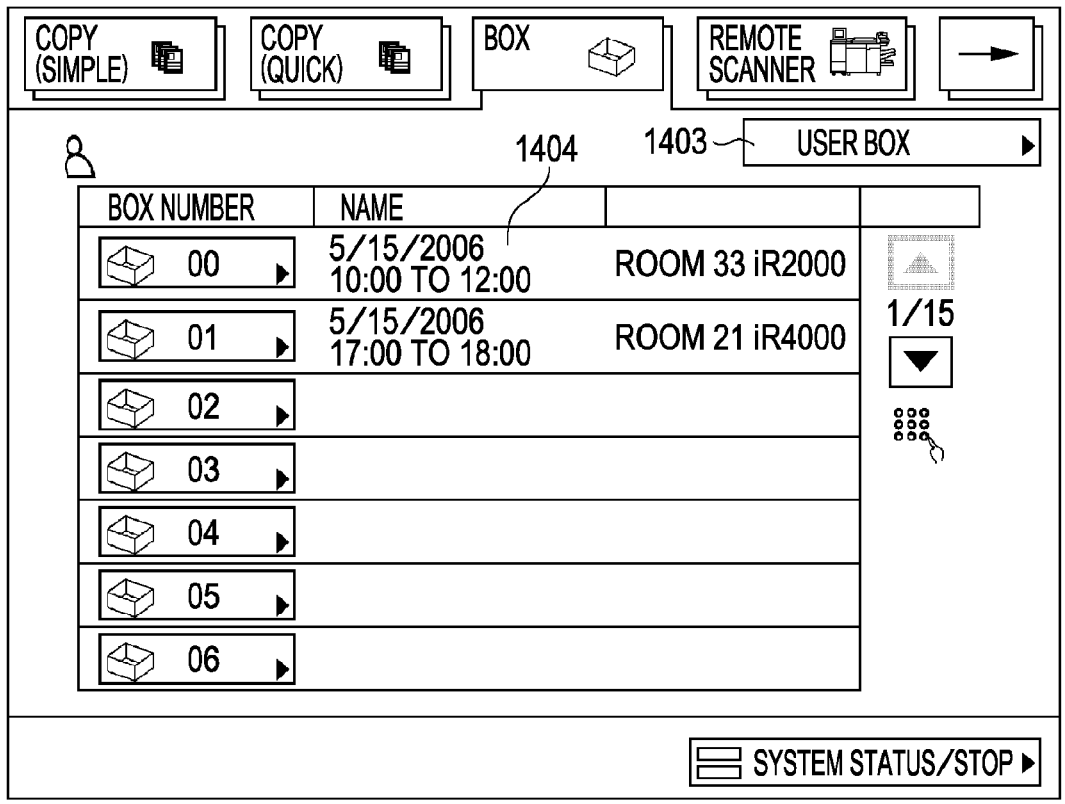
FIG. 23B illustrates the display of the disclosure information.

A user box transition button 1403 is provided on the remote box screen illustrated in FIG. 23B. When a user presses the user box transition button 1403, the UI control unit 800 displays the screen illustrated in FIG. 23A (user box screen).

In addition, on the remote box screen illustrated in FIG. 23B, as denoted by reference numeral 1404, the disclosure information set as the display target including the disclosure period, e.g., the start date, the start time, the end time, the disclosure source, etc., are displayed. In other words, when the remote box transition button 1402 is pressed, the UI control unit 800 refers to the display column of the table illustrated in FIG. 16 to display the disclosure information set as "Yes" on the remote box screen (disclosure information display screen control).

When the button of the corresponding BOX number is pressed, the UI control unit 800 displays a screen illustrated in FIG. 23C.

Through the screen in illustrated in FIG. 23C, a user can refer to the contents of the BOX inside MFP 111. When an image is selected from an image list 1405 and a print button 1406 is pressed, the UI control unit 800 notifies, for example, the acceptance display application unit 817 of identification information for identifying the selected image and information indicating that the print button 1406 is pressed.

Hereinafter, a description will be provided, with reference to FIG. 24, of an example of a transfer request transmission processing performed by the acceptance display application unit 817 of the MFP 112. For example, when the UI control unit 800 displays the screen illustrated in FIG. 23C, the acceptance display application unit 817 starts the processing illustrated in FIG. 24.

In step S81, the acceptance display application unit 817 determines whether a transfer request of the job file related to the image (image data) is to be transmitted. When the acceptance display application unit 817 determines that the transfer request of the job file related to the image is not transmitted, the acceptance display application unit 817 repeatedly performs the processing in step S81. When the acceptance display application unit 817 determines that the transfer request of the job file related to the image is to be transmitted, the flow proceeds to step S82.

When the acceptance display application unit 817 is notified of, for example, the identification information for identifying the selected image and information indicating that the print button 1406 is pressed from the UI control unit 800, the acceptance display application unit 817 determines that the transfer request of the job file related to the image is to be transmitted.

In step S82, the acceptance display application unit 817 transmits the above-described transfer request of the job file related to the image to the MFP 111 of the disclosure source.

Figure 25:
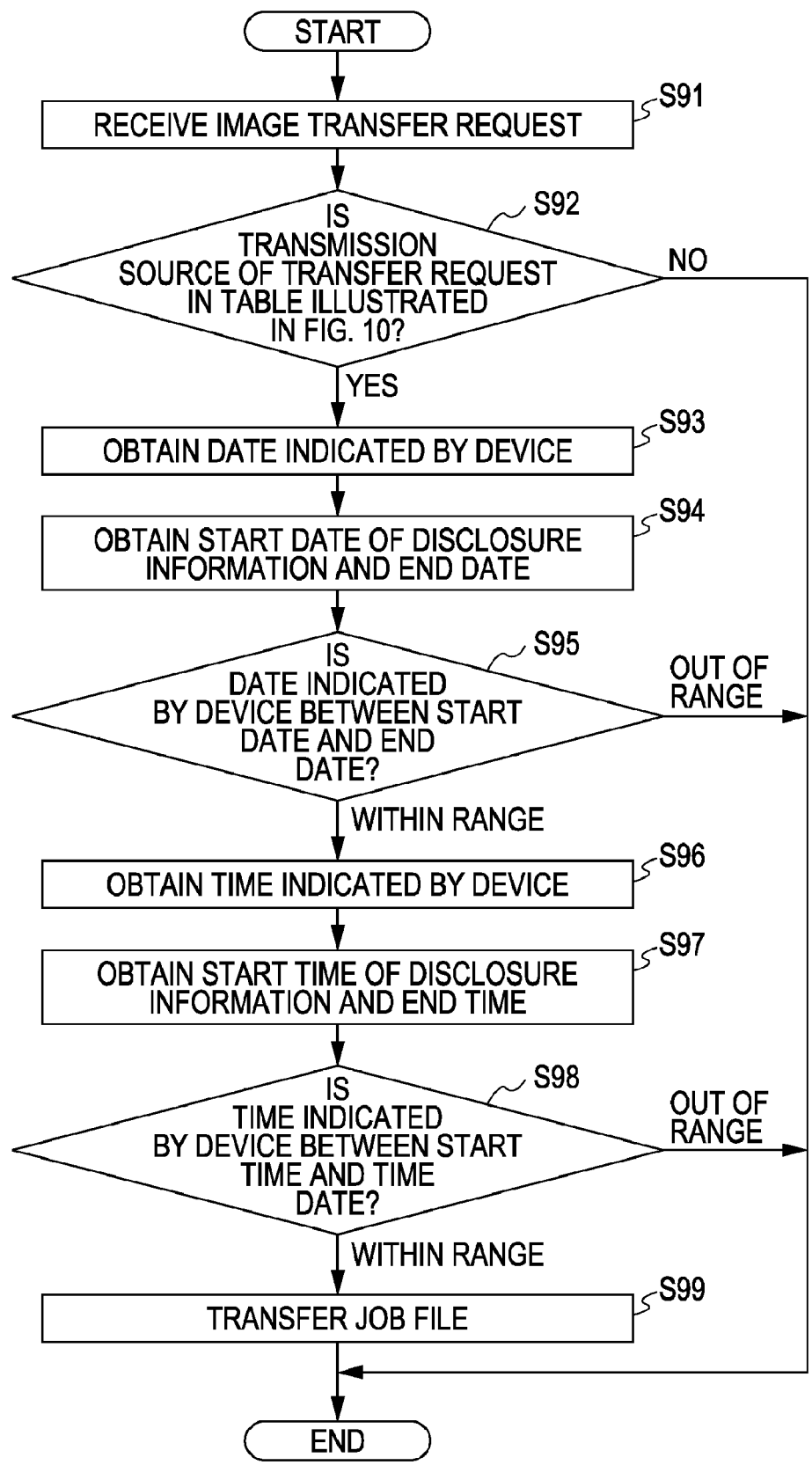
FIG. 25 is a flowchart of a job file transfer processing example.

Hereinafter, a description will be provided, with reference to FIG. 25, of an example of a job file transfer processing performed by the information distribution application unit 816 of the MFP 111 which has received this transfer request.

In step S91, the information distribution application unit 816 receives the image transfer request (or the job file transfer request related to the image) from the MFP 112 that is the disclosure target of the disclosure information (transfer request reception).

Next, in step S92, the information distribution application unit 816 determines whether the transmission source of the transfer request received in step S91 is in the disclosure target column of the table illustrated in FIG. 10. When the information distribution application unit 816 determines that the transmission source of the received transfer request is not in the disclosure target column of the table illustrated in FIG. 10, the processing illustrated in FIG. 25 ends. When the transmission source of the received transfer request determines that the transmission source of the received transfer request is in the disclosure target column of the table illustrated in FIG. 10, the flow proceeds to step S93.

In step S93, the information distribution application unit 816 obtains a date from the timer of the MFP 111.

Next, in step S94, the information distribution application unit 816 obtains a start date and an end date of the corresponding disclosure information.

In step S95, the information distribution application unit 816 determines whether the date indicated by the MFP 111 which is obtained in step S93 is between the start date and the end date of the disclosure information which are obtained in step S94 (within a range). When the information distribution application unit 816 determines that the date is out of the range, the processing illustrated in FIG. 25 ends. When the information distribution application unit 816 determines that the date is within the range, the flow proceeds to step S96.

In step S96, the information distribution application unit 816 obtains a time from the timer of the MFP 111. Then, in step S97, the information distribution application unit 816 obtains a start time and an end time of the corresponding disclosure information.

In step S98, the information distribution application unit 816 determines whether the time indicated by the MFP 111 which is obtained in step S96 is between the start time and the end time of the disclosure information which are obtained in step S97 (within a range). When the information distribution application unit 816 determines that the date is out of the range, the processing illustrated in FIG. 25 ends. When the information distribution application unit 816 determines that the date is within the range, the flow proceeds to step S99.

In step S99, the information distribution application unit 816 transmits the job file related to the image which is requested to be transferred to the MFP 112 of the transmission source of the transfer request.

Figure 26:
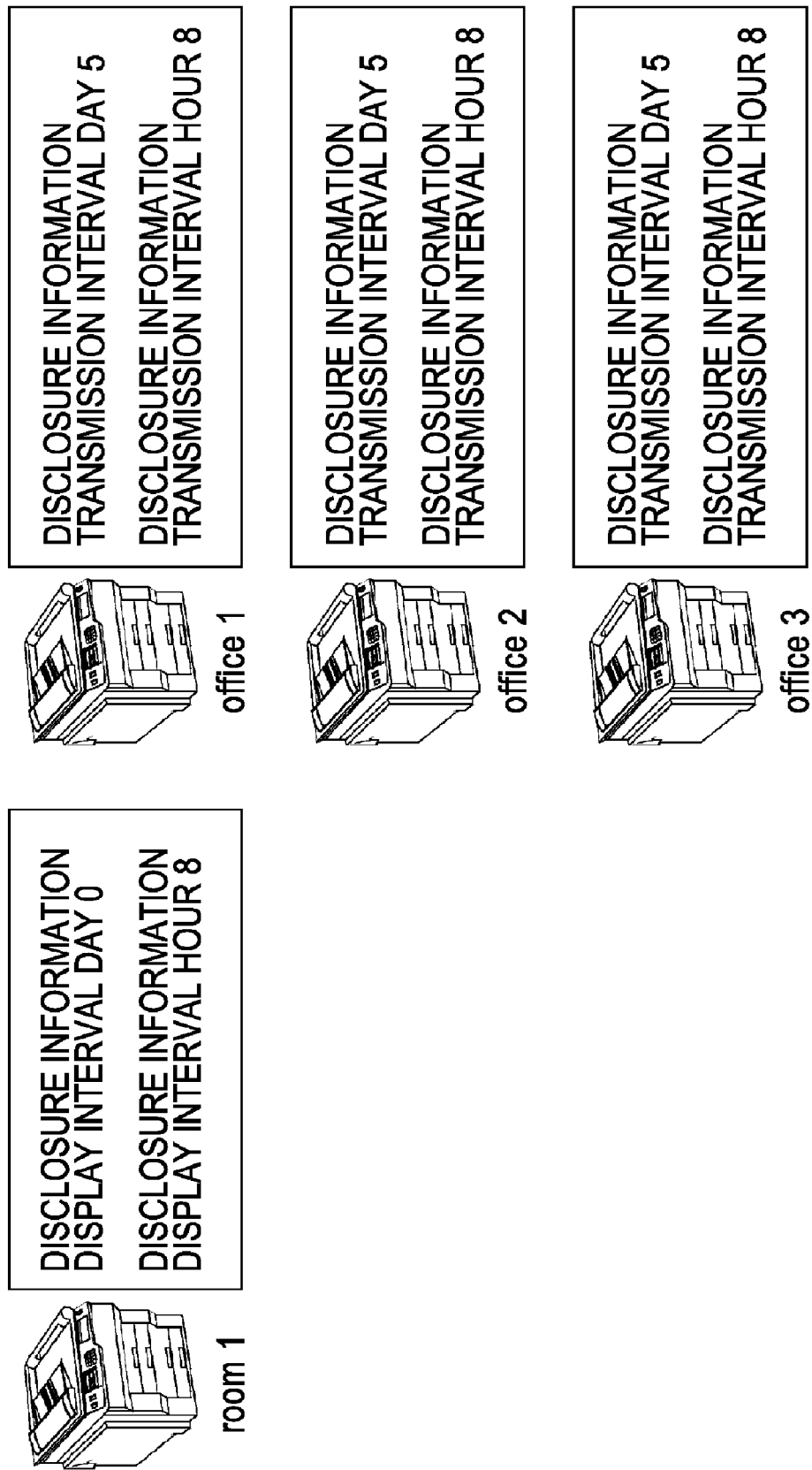
FIG. 26 is a diagram for describing a processing according to the present embodiment.

FIG. 26 through FIG. 29 illustrate processing according to the present embodiment. In FIG. 26, four MFPs are provided and respectively named room 1, office 1, office 2, and office 3. The four MFPs have different IP addresses. A description will be provided where room 1 is set as a disclosure accepting side, and offices 1 to 3 are each set as a disclosure requesting side.

In the room 1, settings for displaying the accepted disclosure information are as follows: the disclosure information display interval day: 0; the disclosure information display interval time: 8.

In the offices 1 to 3, settings for the disclosure information are as follows: the disclosure information transmission interval day: 5; the disclosure information transmission interval hour: 8.

Figure 27:
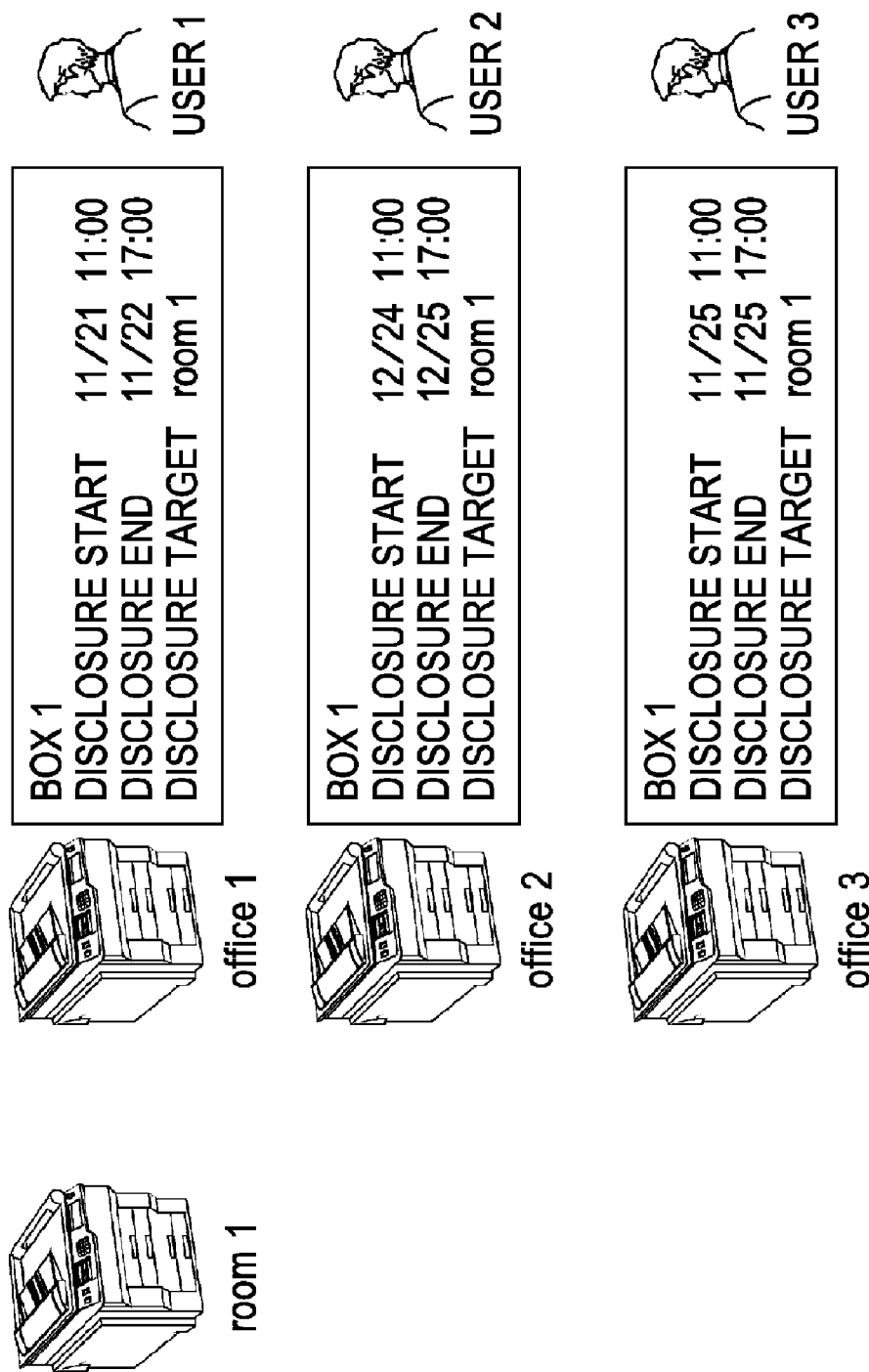
FIG. 27 is a diagram for describing the processing according to the present embodiment.
Figure 28:
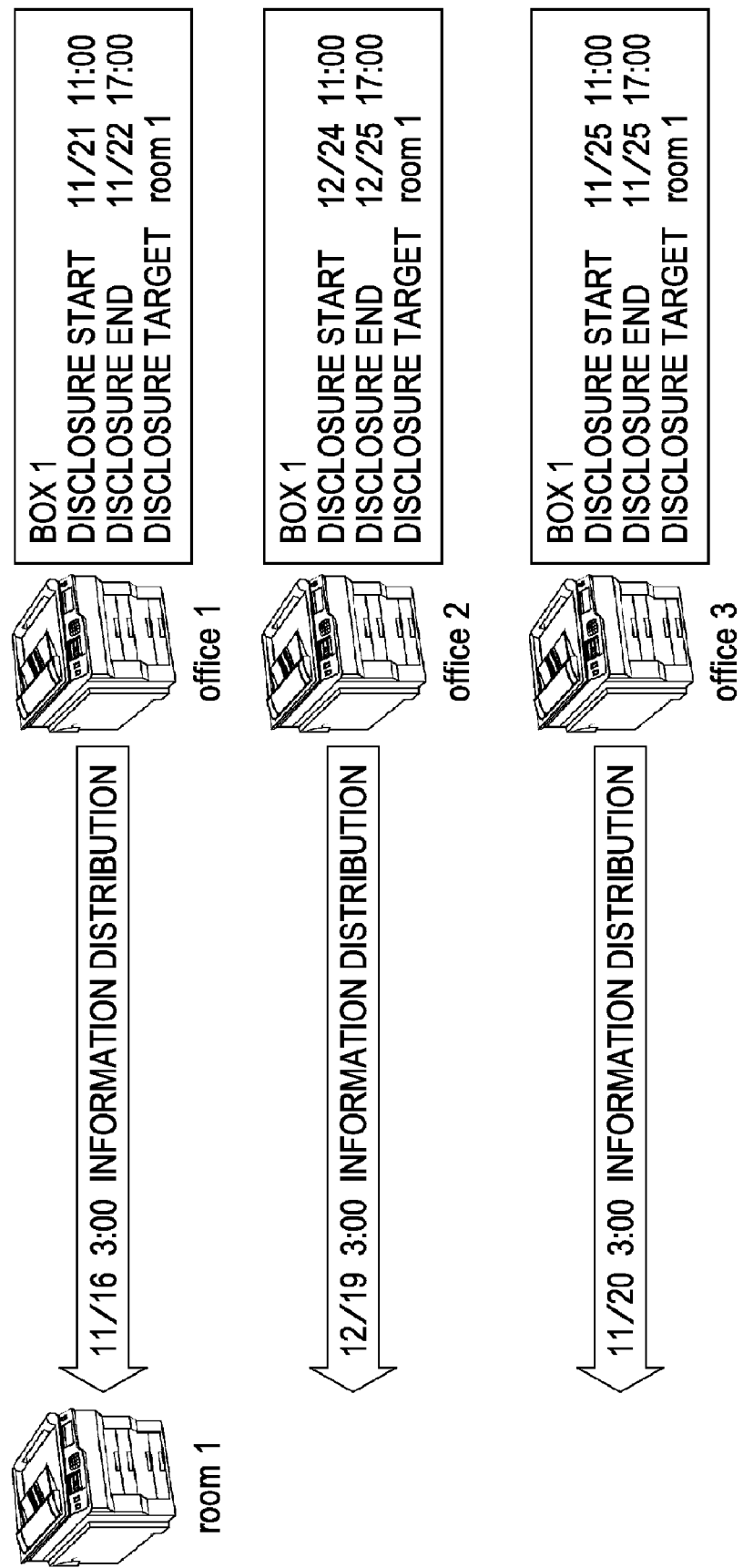
FIG. 28 is a diagram for describing the processing according to the present embodiment.

FIG. 27 illustrates a state in which respective users set the BOX number desired to be disclosed, the time, and the disclosure target in the offices 1 to 3. Even in a case where these settings are performed at one time, through the processing in the information distribution application unit 816 operating on the respective MFPs, the disclosure information pieces are sequentially transmitted at the times illustrated in FIG. 28. Thus, it is possible to avoid transmission of a large amount of the disclosure information to the room 1.

Figure 29:
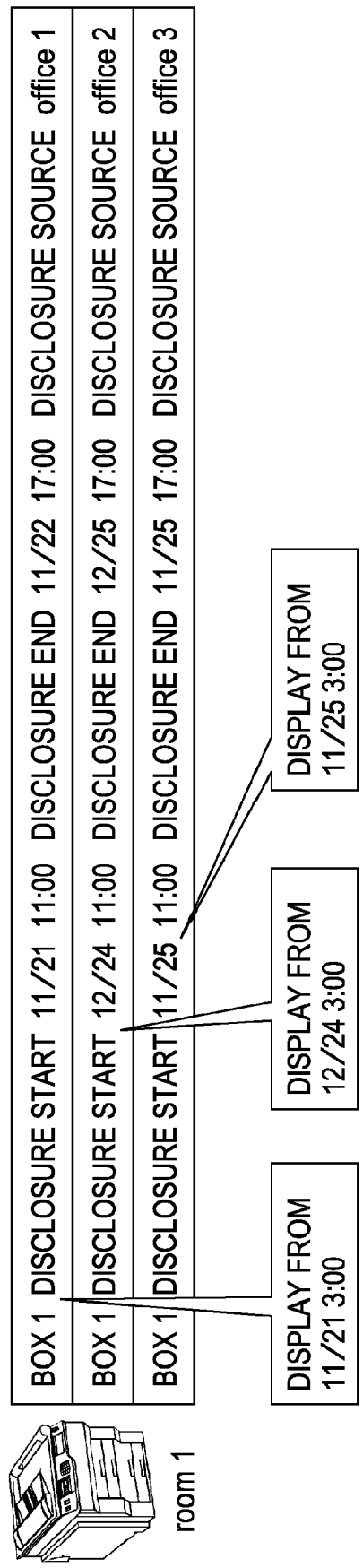
FIG. 29 is a diagram for describing the processing according to the present embodiment.

In addition, as illustrated in FIG. 29, even when a plurality of pieces of the disclosure information are accumulated in the room 1, through the processing of the acceptance display application unit 817, the disclosure information to be seen by a user is limited. Thus, a user can avoid a situation in which the user tries to find the objective disclosure information from among the enormous amount of disclosure targets. In other words, even when a large number of remote connection requests are issued, the user can easily use the remote BOX.

FIG. 30 is an attribute expansion illustrated in FIG. 7. It is possible to hold information equivalent to the table illustrated in FIG. 10 in the job file too. This attribute can be previously set at the time of job input and can be also added after the job file is saved in the MFP.

An ID 500 represents a start date, an ID 501 represents an end date, an ID 502 represents a start time, an ID 503 represents an end time, and an ID 504 represents a destination target. The IDs respectively represent information on the similar content to the table of FIG. 10. The ID 505 is a valid flag. When this value is 1, information from the ID 500 to the ID 504 is valid, and when this value is 0, the information is invalid. The processing in Step S10001 and subsequent steps in FIG. 31 described below is performed only on the file in which this flag is 1.

If the flags are all 0, no consideration is given regarding the disclosure date of all the files, and the date of the box is prioritized. For example, when there is an instruction from the operation panel that the setting of the disclosure date of the box is prioritized, such an embodiment is conceivable that all the IDs 505 of the job file are set as 0.

The ID 506 is a flag indicating whether the processing has been performed. When this value is 1, the processing has been performed, and when this value is 0, the processing has not been performed. It is noted that in the ID 504, for example, such an instruction can be issued from the operation panel that "nobody" is marked on the file. Then, in such a case where the ID 504 is marked "nobody", even when other IDs 500 to 503, 506, and 506 take any value, it is preferable to adopt a specification that the files are not disclosed.

Figure 31:
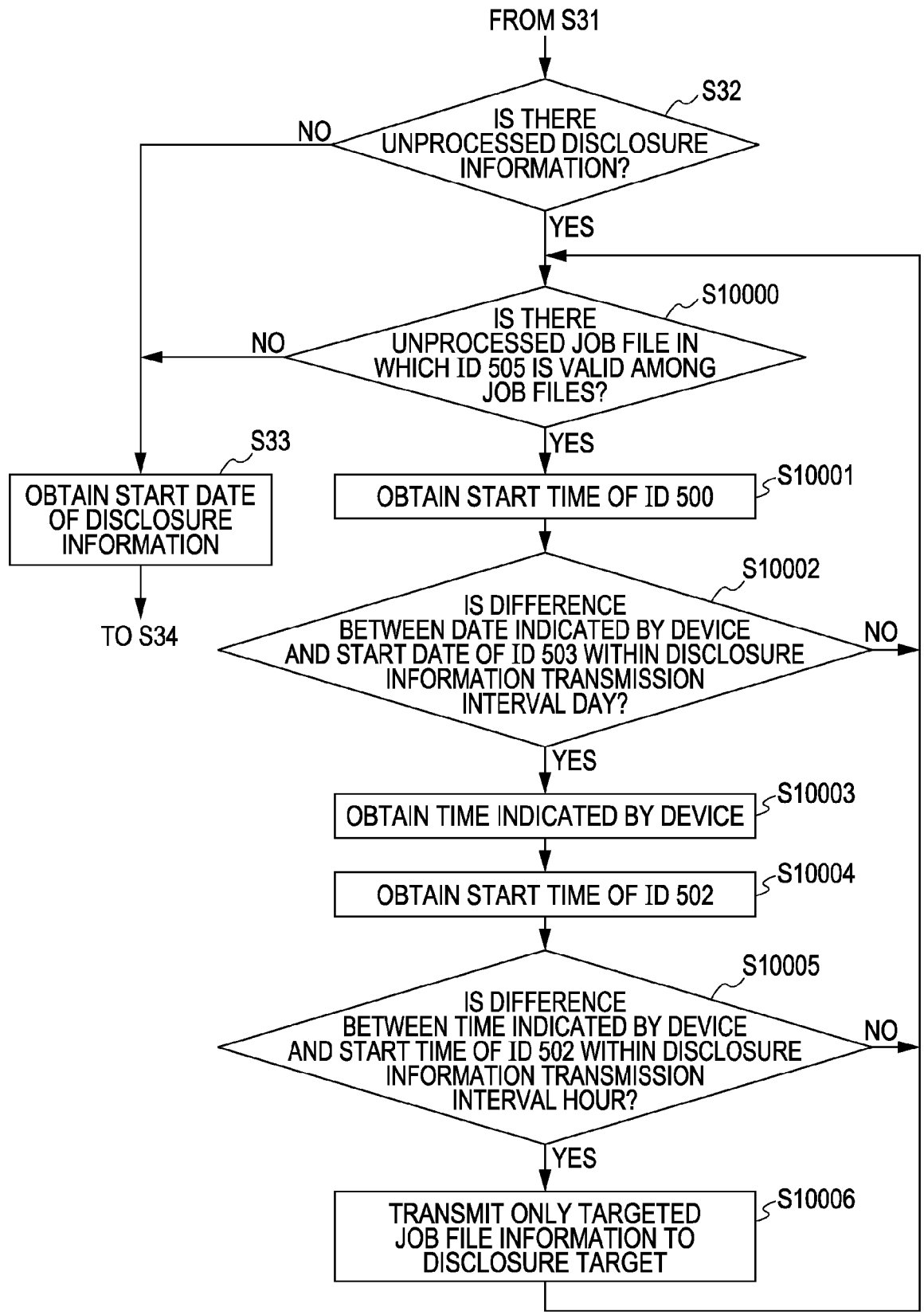
FIG. 31 illustrates an expansion example of FIG. 4.

FIG. 31 is a flowchart in a case of using the present attribute, and has a style in which processing is added between S32 and S33 of the flowchart illustrated in FIG. 14.

When it is determined in step S32 that there is unprocessed disclosed information, the information distribution application unit 816 determines in step S10000 whether a job file in which the ID 505 is valid and the ID 506 is unprocessed exists among the job files. When the ID 505 job file in which the ID 505 is valid and the ID 506 is unprocessed exists, the information distribution application unit 816 continues the processing from S33. In a case where the job file in which the ID 505 is valid and the ID 506 is unprocessed exists, one processing target is selected from the job files in which the ID 505 is valid and the ID 506 is unprocessed.

Next, in step S10001, the information distribution application unit 816 obtains the start date of the ID 500. Then, in step S10002, the information distribution application unit 816 determines whether a difference between the date indicated by the device and the start date of the ID 500 is within the disclosure information transmission interval day.

If the information distribution application unit 816 determines that the difference is outside the disclosure information transmission interval day, the flow returns to step S10000. If the information distribution application unit 816 determines that the difference is within the disclosure information transmission interval day, the flow proceeds to step S10003.

In Step S1003, the information distribution application unit 816 obtains a time from a timer of the MFP 111. Then, in step S10004, the information distribution application unit 816 obtains the start time of the ID 502.

In step S10005, the information distribution application unit 816 determines whether a difference between the time indicated by the device which is obtained in step S10003 and the start time of the ID 502 obtained in step S10004 is within the disclosure information transmission interval hour illustrated in FIG. 13.

If the information distribution application unit 816 determines that the difference is outside the disclosure information transmission interval hour, the flow returns to step S10000. If the information distribution application unit 816 determines that the difference is within the disclosure information transmission interval hour, the flow proceeds to step S10006.

In Step S10006, the information distribution application unit 816 transmits the job file of the processing target to the disclosure target. Then, the information distribution application unit 816 changes the ID 506 to "1". After that, the process returns to step S10000.

As described above, by using the information set in the job file and the information set in the box, it is possible to further improve the usability of the disclosed box in such a manner. For example, only the particular job file registered in the box is disclosed in advance.

Figure 24:
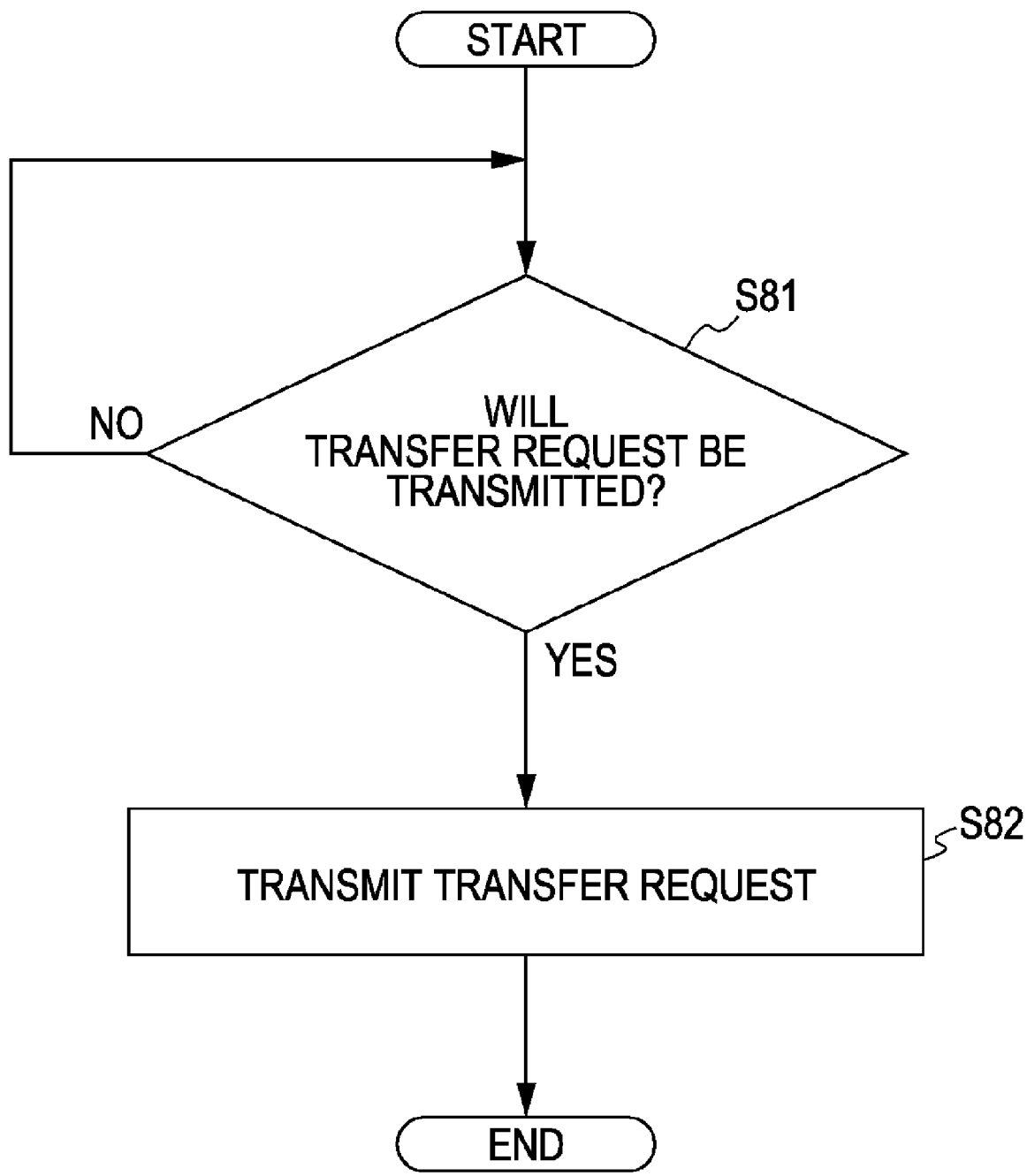
FIG. 24 is a flowchart of a transfer request transmission processing example.

It is noted that in FIG. 32, under the conditions of FIG. 24, the embodiment of FIGS. 30 and 31 is similarly operated. The processing is changed while the part of the condition of the job file is set as the difference.

In addition to the above-described embodiment, additional embodiments of the present invention can be achieved by adopting the following configurations. That is, a storage medium (or a recording medium) which stores a program code of software which realizes the above-described functions of the embodiments is supplied to a system or an apparatus. Then, a central processing unit of the system or the apparatus (a CPU or an MPU) reads and executes the program code stored in the storage medium. In this case, the program code itself read from the storage medium realizes the above-described functions of the embodiments, and the storage medium which stores the program code constitutes the present invention.

In addition, by executing the program code read from by central processing unit of the system or the apparatus, based on instruction of the program code, an operating system (OS) or the like running on the system or the apparatus performs all or a part of an actual processing. The present invention also encompasses a case in which the processing realizes the above-described functions of the embodiments.

Furthermore, the program code read from the storage medium is written into a memory provided to a function expansion card inserted in the system or the apparatus or a connected function expansion unit. After that, based on the instruction of the program code, a CPU or the like provided to the function expansion card or the function expansion unit performs all or a part of the actual processing. The present invention also encompasses a case in which the processing realizes the above-described functions of the embodiments.

In a case where the present invention is applied to the above-described storage medium, the storage medium (computer-readable storage medium) stores a program code corresponding to the above-described flowchart.

As described above, according to the above-described embodiments, it is possible to easily select the MFP, e.g., MFP 111, which stores the data of the image processing target from the MFP, e.g., MFP 112, which performs the image processing.

While the present invention has been described with reference to exemplary embodiments, it is to be understood that the invention is not limited to the disclosed exemplary embodiments. The scope of the following claims is to be accorded the broadest interpretation so as to encompass all modification and equivalent structures and functions.

This application claims the benefit of Japanese Application No. 2007-045585 Feb. 26, 2007, which is hereby incorporated by reference herein in its entirety.

What is claimed is:

1. An image forming apparatus, comprising:
a setting unit configured to set a plurality of disclosure boxes which is a predetermined area in a storage unit and to transmit image data stored in the predetermined area to a connected image forming apparatus;
the storage unit configured to store table information including a start date of disclosure, an end date of the disclosure and a disclosure target as a destination of the disclosure for each of the plurality of disclosure boxes,
wherein a disclosure condition is set in image data stored in the disclosure boxes and the storage unit stores a start date of disclosure as a disclosure condition for disclosing the image data;
a transmission unit configured to transmit the table information stored by the storage unit to the connected image forming apparatus,
wherein, in a case where the start date of disclosure for the image data is earlier than a start date of disclosure for a disclosure box in which the image data is stored, the transmission unit transmits information indicating that the image data is stored in the image forming apparatus to the connected image forming apparatus prior to transmitting the table information, and
wherein range information of a disclosure date range for each of the plurality of disclosure boxes based on the transmitted table information is displayed by the connected image forming apparatus and the information indicating that the image data is stored in the image forming apparatus transmitted prior to the transmitted table information is displayed before the transmitted table information is displayed;
a determination unit configured to determine, when a transmission request for image data stored in a specific disclosure box is sent from the connected image forming apparatus displaying the range information, whether or not a transmission date in the transmission request is within a disclosure date range of the specific disclosure box based on the stored information of the start date and the end date of the disclosure,
wherein the determination unit determines whether or not information on a source of the transmission request is in information on the disclosure target included in the table information; and
a transmission control unit configured to control such that the image data stored in the specific disclosure box is transmitted to the connected image forming apparatus when the information on the source of the transmission request is in the information on the disclosure target included in the table information and the transmission date in the transmission request is determined to be within the disclosure date range of the specific disclosure box, and otherwise to control such that processing is ended without transmitting the requested image data to the connected image forming apparatus.

2. The image forming apparatus according to claim 1, wherein the transmission unit transmits the table information on the start date of disclosure for the disclosure box without regard to the start date of disclosure for the image data, in a case where the start date of disclosure for the disclosure box is set to be prioritized even when the start date of disclosure for the image data is earlier than the start date of disclosure for the disclosure box.

3. The image forming apparatus according to claim 2, wherein the connected image forming apparatus receiving the image data transmitted from the transmission control unit prints out the image data.

4. An image forming method, comprising:
setting a plurality of disclosure boxes which is a predetermined area in a storage unit and transmitting image data stored in the predetermined area to a connected image forming apparatus;
storing table information including a start date of disclosure, an end date of the disclosure and a disclosure target as a destination of the disclosure for each of the plurality of disclosure boxes,
wherein a disclosure condition is set in image data stored in the disclosure boxes and a start date of disclosure is stored as a disclosure condition for disclosing the image data;
transmitting the stored table information to the connected image forming apparatus,
wherein, in a case where the start date of disclosure for the image data is earlier than the start date of disclosure for a disclosure box in which the image data is stored, information indicating that the image data is stored in the image forming apparatus is transmitted to the connected image forming apparatus prior to transmitting the table information, and
wherein range information of a disclosure date range for each of the plurality of the disclosure boxes based on the transmitted table information is displayed by the connected image forming apparatus and the information indicating that the image data is stored in the image forming apparatus transmitted prior to the transmitted table information is displayed before the transmitted table information is displayed;

determining, when a transmission request for image data stored in a specific disclosure box is sent from the connected image forming apparatus displaying the range information, whether or not a transmission date in the transmission request is within a disclosure date range of the specific disclosure box based on the stored information of the start date and the end date of the disclosure, wherein the determination unit determines whether or not information on a source of the transmission request is in information on the disclosure target included in the table information; and controlling such that the image data stored in the specific disclosure box is transmitted to the connected image forming apparatus when the information on the source of the transmission request is in the information on the disclosure target included in the table information and the transmission date in the transmission request is determined to be within the disclosure date range of the specific disclosure box, and otherwise to control such that processing is ended without transmitting the requested image data to the connected image forming apparatus.

5. The image forming method according to claim 4, wherein the table information is transmitted on the start date of disclosure for the disclosure box without regard to the start date of disclosure for the image data, in a case where the start date of disclosure for the disclosure box is set to be prioritized even when the start date of disclosure for the image data is earlier than the start date of disclosure for the disclosure box.

6. The image forming method according to claim 5, wherein the connected image forming apparatus receiving the image data transmitted during the transmission step prints out the image data.

7. A non-transitory computer-readable storage medium storing a program that causes a computer to execute an image forming method, the method comprising:

setting a plurality of disclosure boxes which is a predetermined area in a storage unit and transmitting image data stored in the predetermined area to a connected image forming apparatus;

storing table information including a start date of disclosure, an end date of the disclosure and a disclosure target as a destination of the disclosure for each of the plurality of disclosure boxes, wherein a disclosure condition is set in image data stored in the disclosure boxes and a start date of disclosure is stored as a disclosure condition for disclosing the image data;

transmitting the stored table information to the connected image forming apparatus, wherein, in a case where the start date of disclosure for the image data is earlier than a start date of disclosure for a disclosure box in which the image data is stored, information indicating that the image data is stored in the image forming apparatus is transmitted to the connected image forming apparatus prior to transmitting the table information, and wherein range information of a disclosure date range for each of the plurality of the disclosure boxes based on the transmitted table information is displayed by the connected image forming apparatus and the information indicating that the image data is stored in the image forming apparatus transmitted prior to the transmitted table information is displayed before the transmitted table information is displayed;

determining, when a transmission request for image data stored in a specific disclosure box is sent from the connected image forming apparatus displaying the range information, whether or not a transmission date in the transmission request is within a disclosure date range of the specific disclosure box based on the stored information of the start date and the end date of the disclosure, wherein the determination unit determines whether or not information on a source of the transmission request is in information on the disclosure target included in the table information; and controlling such that the image data stored in the specific disclosure box is transmitted to the connected image forming apparatus when the information on the source of the transmission request is in the information on the disclosure target included in the table information and the transmission date in the transmission request is determined to be within the disclosure date range of the specific disclosure box, and otherwise to control such that processing is ended without transmitting the requested image data to the connected image forming apparatus.

8. The non-transitory computer-readable storage medium storing a program that causes a computer to execute an image forming method according to claim 7, wherein the table information is transmitted on the start date of disclosure for the disclosure box without regard to the start date of disclosure for the image data, in a case where the start date of disclosure for the disclosure box is set to be prioritized even when the start date of disclosure for the image data is earlier than the start date of disclosure for the disclosure box.

9. The non-transitory computer-readable storage medium storing a program that causes a computer to execute an image forming method according to claim 8, wherein the connected image forming apparatus receiving the image data transmitted during the transmission step prints out the image data.

* * * * *